(12) United States Patent
Richardson

(10) Patent No.: US 11,795,646 B2
(45) Date of Patent: Oct. 24, 2023

(54) SYSTEM FOR REDUCING CONTAMINANTS IN A BODY OF WATER

(71) Applicant: Ironclad Siege, LLC, West Palm Beach, FL (US)

(72) Inventor: Keith Allan Richardson, Lake Worth, FL (US)

(*) Notice: Subject to any disclaimer, the term of this patent is extended or adjusted under 35 U.S.C. 154(b) by 315 days.

(21) Appl. No.: 17/105,682

(22) Filed: Nov. 27, 2020

(65) Prior Publication Data

US 2021/0156101 A1 May 27, 2021

Related U.S. Application Data

(60) Provisional application No. 62/941,471, filed on Nov. 27, 2019.

(51) Int. Cl.
| | | |
|---|---|---|
| *E02B 8/02* | (2006.01) | |
| *C02F 3/32* | (2023.01) | |
| *C02F 1/00* | (2023.01) | |
| *C02F 1/28* | (2023.01) | |
| *E02B 3/02* | (2006.01) | |

(Continued)

(52) U.S. Cl.
CPC .............. *E02B 8/026* (2013.01); *C02F 1/001* (2013.01); *C02F 1/008* (2013.01); *C02F 1/283* (2013.01);
(Continued)

(58) Field of Classification Search
CPC . E02B 8/026; E02B 3/023; E02B 3/02; E02B 3/18; C02F 1/001; C02F 1/008;
(Continued)

(56) References Cited

U.S. PATENT DOCUMENTS

| 4,169,050 A | 9/1979 | Serfling et al. |
|---|---|---|
| 5,893,978 A | 4/1999 | Yoda et al. |

(Continued)

FOREIGN PATENT DOCUMENTS

| CN | 101314612 B | 7/2011 | |
|---|---|---|---|
| CN | 207294351 U | * 5/2018 | ............ Y02W 10/10 |

(Continued)

OTHER PUBLICATIONS

KR101615356B1_GONG_translated.pdf (Year: 2016).*
(Continued)

*Primary Examiner* — Ekandra S. Miller-Cruz
(74) *Attorney, Agent, or Firm* — Derek Fahey, Esq.; The IP Plus Firm, PLLC

(57) ABSTRACT

A system for reducing contaminants in body of water is shown and described. The system has a first land mass located within a body of water. A sediment trap, located on the floor of the body of water, is configured to collect sediment. Enclosed within the first land mass is a tussock mass area, surrounding a central area, and configured for collecting sediment and building a second land mass. The central area of the system is configured for removing contaminants from sediment. Sediment is moved from the sediment trap to the central area by a first ingress conduit and a pumping system. Filtered water migrates from the central area to outside the first land mass via an egress conduit; contaminated sediment is sequestered in the central area enclosed by the tussock mass area.

19 Claims, 20 Drawing Sheets

(51) Int. Cl.
*C02F 101/10* (2006.01)
*C02F 103/00* (2006.01)

(52) U.S. Cl.
CPC .............. *C02F 3/327* (2013.01); *E02B 3/023* (2013.01); *C02F 2001/007* (2013.01); *C02F 2101/105* (2013.01); *C02F 2103/007* (2013.01); *C02F 2201/009* (2013.01); *C02F 2209/18* (2013.01); *C02F 2209/40* (2013.01)

(58) Field of Classification Search
CPC .... C02F 1/283; C02F 3/327; C02F 2001/007; C02F 2101/105; C02F 2103/007; C02F 2201/009; C02F 2209/18; C02F 2209/40
USPC ........................................................ 210/602
See application file for complete search history.

(56) References Cited

U.S. PATENT DOCUMENTS

| | | |
|---|---|---|
| 2002/0150429 A1 | 10/2002 | Hull |
| 2003/0024874 A1 | 2/2003 | Wallace et al. |
| 2011/0297596 A1 | 12/2011 | Hondulas |
| 2012/0058542 A1 | 3/2012 | Wu et al. |

FOREIGN PATENT DOCUMENTS

| | | | | |
|---|---|---|---|---|
| CN | 209065542 U | | 7/2019 | |
| KR | 20090112622 A | * | 10/2009 | .............. C02F 1/001 |
| KR | 101615356 B1 | * | 4/2016 | .............. Y02A 20/30 |
| NO | 165851 B | * | 1/1991 | ................ E02B 8/02 |
| WO | 9306050 A1 | | 4/1993 | |
| WO | WO-2018090154 A1 | * | 5/2018 | ................ C02F 1/00 |

OTHER PUBLICATIONS

NO165851B_STOELE_translated.pdf (Year: 1991).*
WO2018090154A1_RODRIGUEZ_translated.pdf (Year: 2018).*
KR20090112622A_Woo_translated.pdf (Year: 2009).*
Translation of Wu (CN_207294351_U) (Year: 2018).*

* cited by examiner

SYSTEM FOR REDUCING CONTAMINANTS IN A BODY OF WATER

CROSS-REFERENCE TO RELATED APPLICATIONS

This application claims the benefit of the filing date of U.S. Provisional Application Ser. No. 62/941,471 titled "SYSTEM FOR REDUCING CONTAMINANTS IN A BODY OF WATER" and filed Nov. 27, 2019 and the subject matter of which is incorporated herein by reference.

TECHNICAL FIELD

The present invention relates to the field of reducing contaminants in a body of water, and more specifically to the field of redistributing sediment from the floor of a body of water into compartmentalized regions for the removal of contaminants.

BACKGROUND

Harmful algal blooms, or HABs, occur when colonies of algae—simple plants that live in the sea and freshwater—grow out of control and produce toxic or harmful effects on people, fish, shellfish, marine mammals, and birds. Red tides, blue-green algae, and cyanobacteria are examples of HABs that can have severe impacts on human health, aquatic ecosystems, and the economy.

In freshwater, estuary, and marine environments, HABs can lower dissolved oxygen levels, reduce light penetration, degrade aesthetic condition, and produce nuisance odors. Some HABs also produce toxins that can be lethal at all levels of aquatic and terrestrial food webs, from insects to fish to birds. These biological toxins can cause skin rashes for humans who swim in contaminated lakes and sicken humans who eat contaminated shellfish. Equally troubling, the toxins produced by HABs can remain viable for many months. Unlike a bloom that might die off in a matter of weeks, HAB toxins can settle into sediment in lakes and coastal marine areas, creating a long-term exposure route for both animals and humans. HAB toxins produced in lakes and rivers also can be transported to the coastal zone, extending their reach across the land-sea interface.

Although all coastal states experience HABs, different organisms live in different places and cause different problems. Other factors, such as the structure of the coast, runoff, oceanography, and other organisms in the water, can also change the scope and severity of HAB impacts. Studies show that several algal species flourish when wind and water currents are favorable. In other cases, HABs may be linked to overfeeding. This occurs when nutrients (mainly phosphorus and nitrogen) from sources such as lawns and agriculture flow into bays, rivers, and the sea, and build up at a rate that overfeeds the algae that exist normally in the environment. Some HABs appear in the aftermath of natural phenomena like sluggish water circulation, unusually high-water temperatures, and extreme weather events like hurricanes, floods, and drought.

HABs blooms are a national concern because they affect not only the health of people and marine ecosystems, but also the health of the economy—especially coastal communities dependent on the income of jobs generated through fishing and tourism. Attempts to mitigate HABs blooms, for example by eliminating or reducing the levels of HAB organisms through biological, chemical, or physical removal mechanisms, or minimizing or preventing introductions of invasive HAB species, their cysts, and organisms that facilitate the success of HAB species, are costly and fail to make a meaningful impact.

Therefore, with climate change and increasing nutrient pollution potentially causing HABs to occur more often and in locations not previously affected, a need exists to improve over the prior art and more particularly, for a cost-effective control and mitigation system for reducing the impact of harmful algal blooms on people, the economy, and the environment.

SUMMARY

A system and methods for reducing contaminants in a body of water is disclosed. This Summary is provided to introduce a selection of disclosed concepts in a simplified form that are further described below in the Detailed Description including the drawings provided. This Summary is neither intended to identify key features or essential features of the claimed subject matter, nor is this Summary intended to be used to limit the claimed subject matter's scope.

In one embodiment, a system for reducing contaminants in a body of water. The system comprises: (a) a first land mass defining a first enclosed area within the body of water, (b) a lagoon enclosed by the first land mass, (c) a sediment trap defined by a trench on a floor of the body of water outside the first land mass, wherein the sediment trap is configured for collecting sediment, (d) a tussock mass area enclosed by the first land mass, wherein the tussock mass area is configured for collecting sediment and building a second land mass for roots and trees, (e) a backwash zone comprising a volume of water, wherein the backwash zone is positioned between the tussock mass area and the first land mass, (f) a central area surrounded by the tussock mass area, wherein the central area is configured for removal of contaminants from sediment, (g) a first ingress conduit and a first pumping system, wherein the first ingress conduit extends from the sediment trap to the central area, wherein the first ingress conduit and the first pumping system are configured for moving the sediment from the sediment trap to the central area, and, (h) an egress conduit extending from the backwash zone to outside the first land mass, wherein the egress conduit passively allows filtered water having a minimal amount of contaminated sediment to move from the backwash zone to outside the first land mass.

In one embodiment, a system further comprises (a) a pump in fluid communication with the first ingress conduit configured to move water into an inlet of the first ingress conduit, (b) a sensor for detecting a metric of an attribute associated with the pump, (c) a power source in electrical communication with the pump, (d) a first vertical structure positioned at a first location near the inlet of the first ingress conduit, (e) a first arm in attachment with the first vertical structure, the first arm connecting a first portion of the first ingress conduit to the first vertical structure, and wherein the first arm adjusts the first portion of the first ingress conduit based on the metric of the attribute associated with the pump.

In one embodiment, a method for reducing contaminants from a body of water comprises: (a) pumping through an ingress conduit, the contaminated sediment and the water from outside the first enclosed area to a central area within the first enclosed area, (b) allowing settling of the contaminated sediment in the central area, such that the contaminants in the contaminated sediment accumulate within the first enclosed area, (c) removing contaminants within the first enclosed area with vegetation disposed within the first enclosed area, and, (d) removing purified water though an egress conduit, where the purified water has a reduced concentration of contaminants.

Additional aspects of the disclosed embodiment will be set forth in part in the description which follows, and in part will be obvious from the description, or may be learned by practice of the disclosed embodiments. The aspects of the disclosed embodiments will be realized and attained by means of the elements and combinations particularly pointed out in the appended claims. It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute part of this specification, illustrate embodiments of the invention and together with the description, serve to explain the principles of the disclosed embodiments. The embodiments illustrated herein are presently preferred, it being understood, however, that the invention is not limited to the precise arrangements and instrumentalities shown, wherein.

DETAILED DESCRIPTION

Figure 1A:
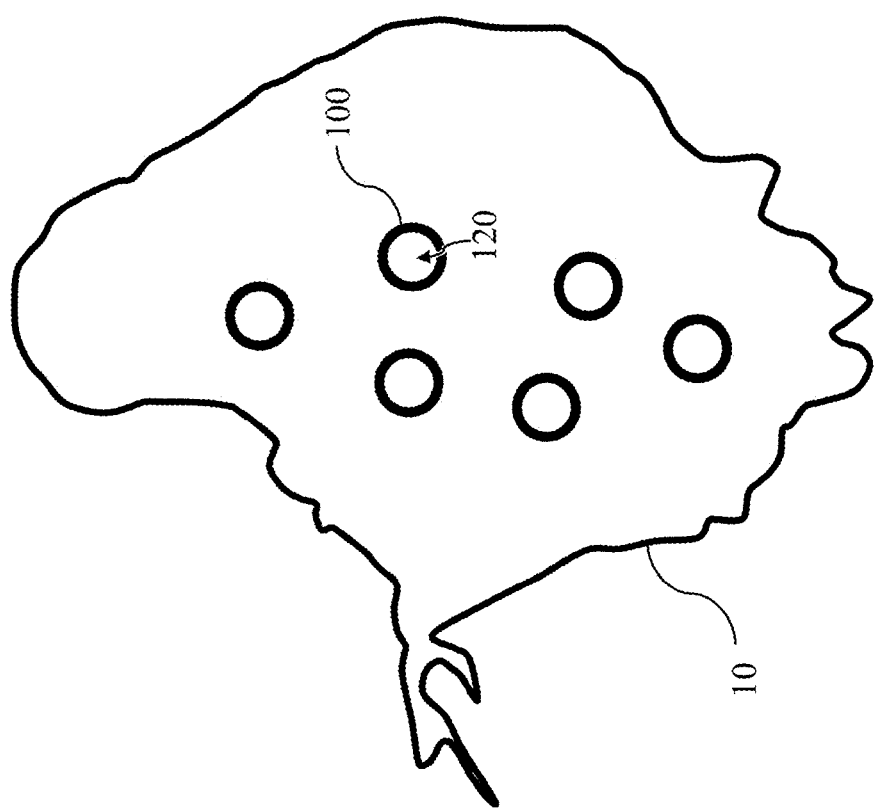
FIG. 1a is a top-view stylized representation of Lake Okeechobee of the state of Florida, the body of water having a plurality of systems for reducing contaminants in the body of water.

The following detailed description refers to the accompanying drawings. Whenever possible, the same reference numbers are used in the drawings and the following description to refer to the same or similar elements. While disclosed embodiments may be described, modifications, adaptations, and other implementations are possible. For example, substitutions, additions, or modifications may be made to the elements illustrated in the drawings, and the methods described herein may be modified by substituting reordering or adding additional stages or components to the disclosed methods and devices. Accordingly, the following detailed description does not limit the disclosed embodiments. Instead, the proper scope of the disclosed embodiments is defined by the appended claims.

a. Improvements Over the Prior Art and Introduction

The present invention improves upon the prior art by providing a system for reducing contaminants in a body of water. The present invention improves upon the prior art by providing a system and methods that enables the capture of contaminant-containing sediment to sequester it permanently. In contradistinction, conventional dredging in the prior art only temporarily moves contaminant-containing sediment. The present invention further improves upon the prior art by providing a continual maintenance plan to address the formation of contaminant-containing sediment in the body of water. In the present invention, the redistribution of contaminant-containing sediment into systems (e.g., may be described as segregated lagoons) within the body of water addresses the high contamination (e.g., phosphorus contamination) without laborious removal efforts. The system is configured such that sediment remains in the central area of the system, and such that a minimal amount of sediment moves traverses from the central area to outside the tussock mass. Furthermore, the central area is dewatered daily when the pumps shut down and the water reverses direction to outside the system and back into the body of water. As a result, the system provides natural ecosystems the ability to restore themselves to their previous condition before vast amounts of contamination and depletion of natural vegetation changed the course of the sustainability of the body of water in its natural state.

The present invention also improves upon the prior art by producing a viable ecosystem using the waste product that is removed from an unfavorable set of conditions. For example, the systems will transition into marshy wetlands supported by nutrients found in the contaminant-containing sediment, providing ideal habitats for native vegetation, wading birds, and other wildlife. The arrangement of the zones in the systems in combination with the daily backwashing also provides feeding opportunities and waterfront nesting, free of predators.

The present invention further improves upon the prior art by relying on natural sediment settling properties to facilitate movement, along with primarily lateral piping to minimize energy and pump requirements. The system includes an egress conduit system for passively allowing filtered water, having a minimal amount or free of sediment, within a region between the tussock mass and the first land mass to move to the body of water due to the hydrostatic force created by the higher water level inside of the lagoon.

The term, "decontaminated" or "purified" in relation to water and/or sediment as used herein means the water and/or sediment has a lower concentration of at least one contaminant relative to the source of the water and/or sediment. The contaminant need not be in a single form. For instance, the contaminant may be present in a dissolved form in the water, as well as a solid form in the sediment. Only one of the forms of the contaminant may be reduced to produce the decontaminated or purified water. Thus, a contaminant-containing sediment may be effectively filtered by settling the sediment from the water using the methods and systems described herein. In this sense, the term, "filtered" may be synonymous with the word "purified" unless the context dictates otherwise.

The term, "lagoon" as used herein refers to a body of water enclosed by a land mass, where the land mass is enclosed by a separate body of water.

Referring now to FIG. 1a, a plurality of systems 100 in a body of water 10 are shown. Body of water 10 is a stylized representation of Lake Okeechobee of the state of Florida. As will become apparent with the foregoing description and figures, the systems 100 are, generally speaking, large, man-made geological structures. The design of each structure includes a plurality of different zones. Each zone contributes a particular structure and/or function that is described in greater detail below. Regardless, each system 100 comprises a central area 170 that sediment-containing water is pumped to. The sediment-containing water is pumped to the central area 170 when solar power is available. Thus, the structure experiences a light-cycle (where sediment-containing water is pumped inside the system 100 and a dark-cycle (where no pumping occurs). During the dark-cycle, purified water is allowed to drain from the system 100 back into the body of water 10.

The sediment generally comprises at least one contaminant. In one embodiment, the contaminant is phosphorous. Phosphorous contamination is known for contributing significantly to harmful algal blooms ("HABs"). It is understood that phosphorous contamination may originate from phosphorous-containing fertilizer used in industrial agriculture. Unfortunately, some phosphorous fertilizers (e.g., phosphate fertilizers) are soluble in water, and are therefore mobile in the soil. Due to the mobility, runoff water that ultimately ends up in large bodies of water (e.g., lakes) may be contaminated with excessive levels of phosphorous. Due to industrial agriculture and other human activities, phosphorous levels in some bodies of water are increasing year-over-year. Without reducing the phosphorous levels in the bodies of water, HABs are likely to occur every year.

Regardless of its' origin, the phosphorous contamination may be present in the body of water 10 in a variety of forms. For instance, the phosphorous may be dissolved as ions such as phosphate ($PO_4^{2-}$). The phosphorous may also be present in the form of solid materials (e.g., precipitates), such as iron phosphates. Moreover, the phosphorous may be adsorbed to the surfaces of solid materials such as iron oxides.

Despite being referred to as a "contaminant," phosphorous is required by natural life. Phosphorous is incorporated into the structure of deoxyribonucleic acid ("DNA") and ribonucleic acid ("RNA"). Moreover, phosphorous is required in the cellular energy cycle via adenosine triphosphate ("ATP"). The requirement of phosphorous for natural life is leveraged in the systems 100 to reduce the phosphorous contaminant levels in the body of water 10. The contaminant-containing sediment provides nutrients for natural life to flourish. Natural life (e.g., plants) are grown inside each system 100, and the natural life effectively removes at least some of the contaminants from the body sediment-containing water. With time, an ecosystem may develop that naturally repurposes the contaminant(s) to be biologically productive. Other materials inside each system 100, such as carbonaceous aggregate, may also reduce the contaminant levels.

b. System Zones

Figure 1B:
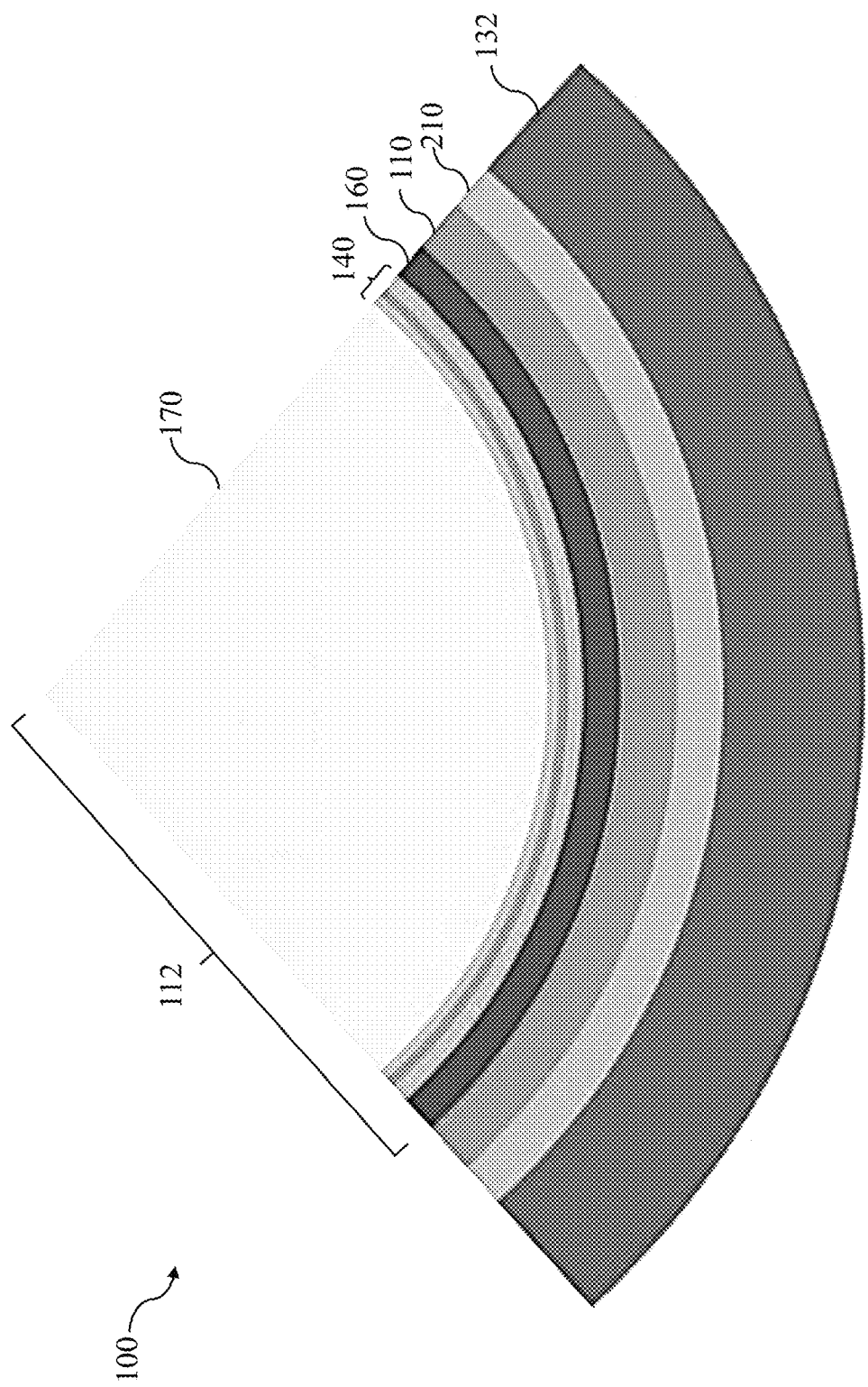
FIG. 1b is a top-view schematic of an example system for reducing contaminants in a body of water.
Figure 1C:
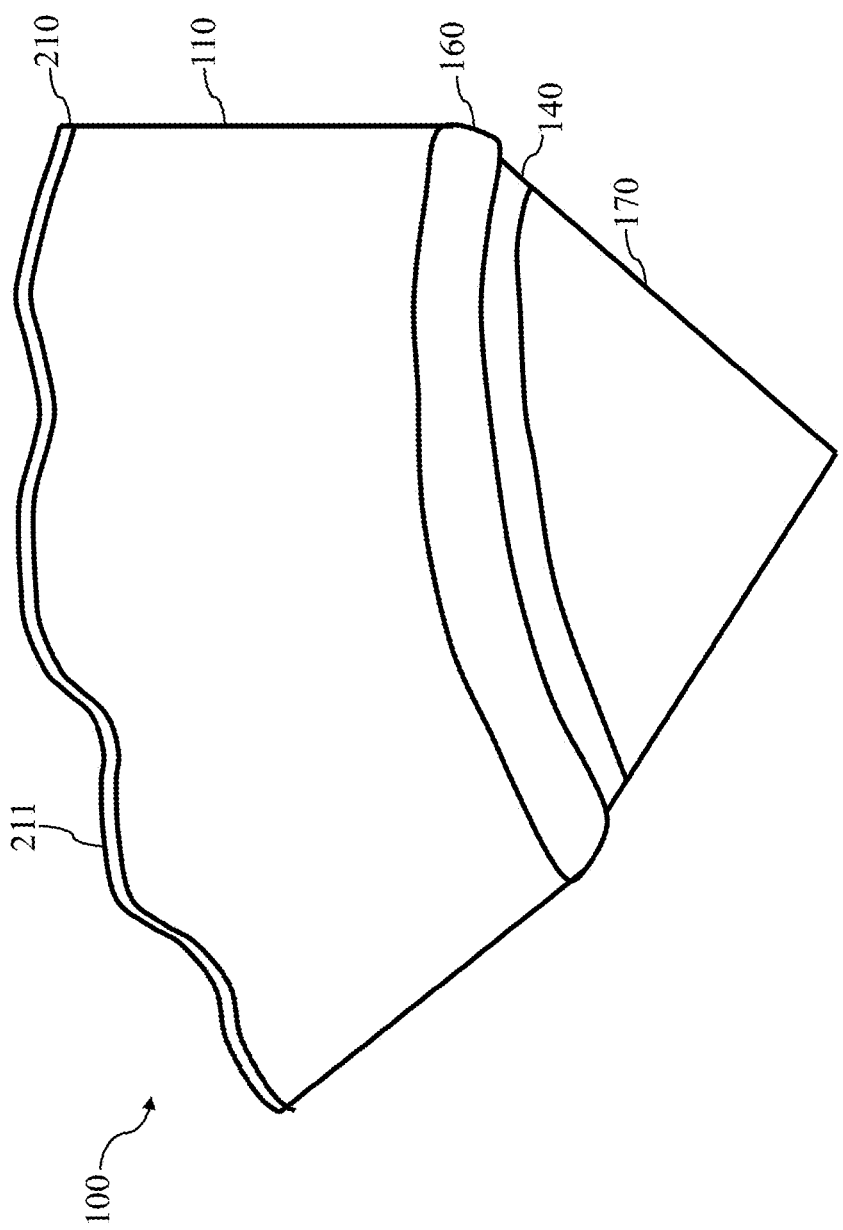
FIG. 1c is a top-view schematic of an example system for reducing contaminants in a body of water, illustrating the corrugated shape of the outer erosion barrier.
Figure 1D:
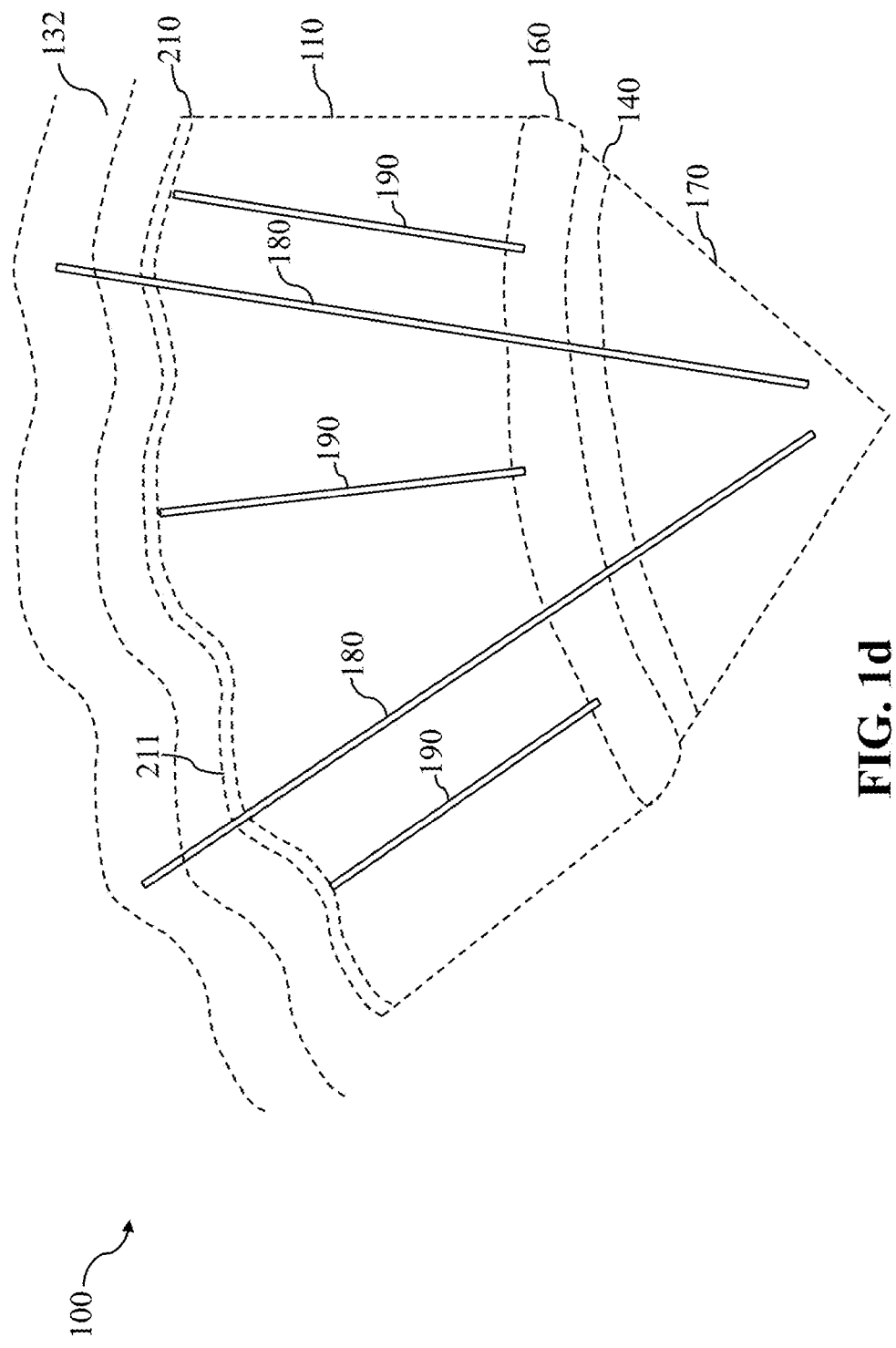
FIG. 1d is a top-view schematic of an example system for reducing contaminants in a body of water, illustrating the conduits.

With reference to the figures now including FIG. 1b, a top-view (aerial view) schematic of a portion of an example system 100 for reducing contaminants in a body of water is shown. FIGS. 1c and 1d also show a similar aerial view of a portion of an example system 100. As illustrated, the system 100 is segregated into a plurality of zones. The zones include a trench 132, a first land mass area 110, a backwash zone 160, a tussock mass area 140, an erosion barrier 210, and a central area 170. With reference to the figures including all figures for the sake of simplicity, each zone is described in greater detail below, starting from the outermost portions of the system toward the center portions.

i. Trench

Figure 2:
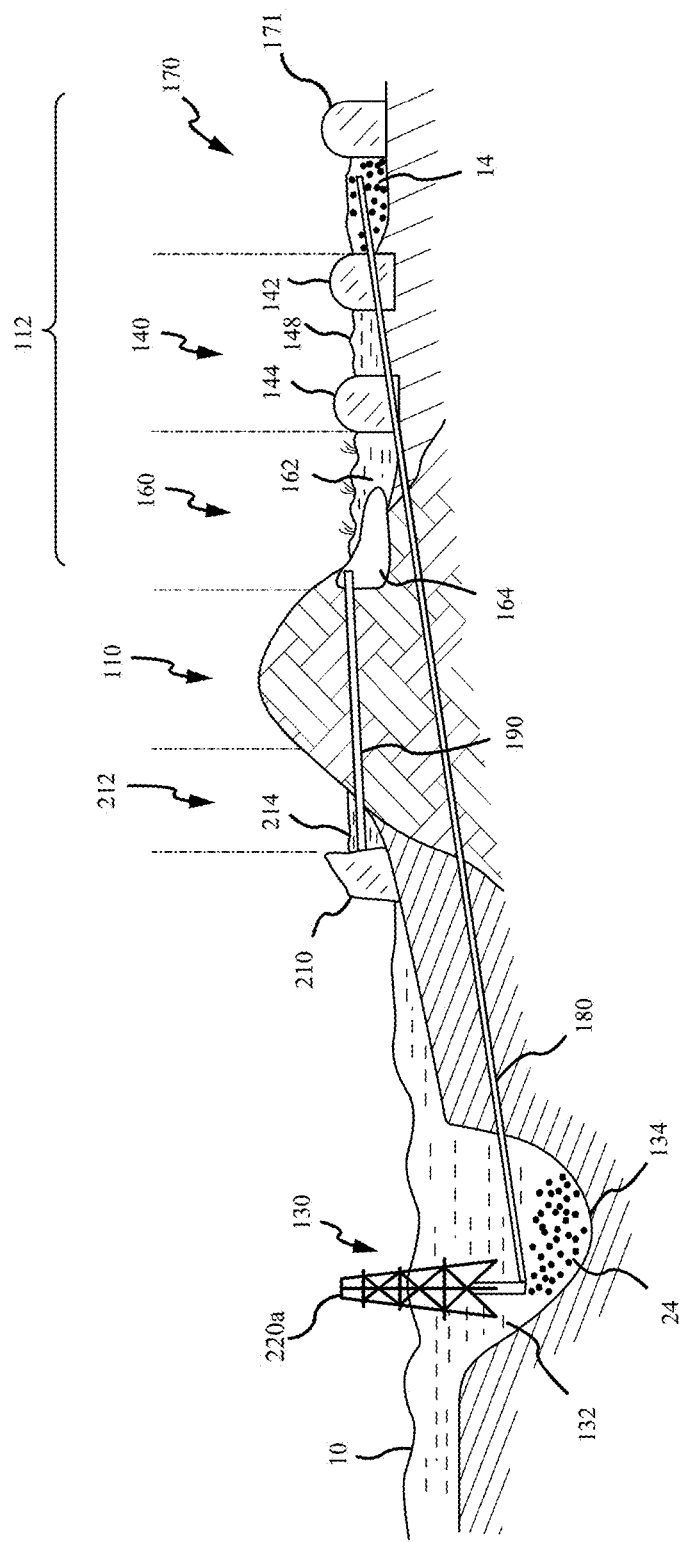
FIG. 2 is a side-view perspective diagram of an example system for reducing contaminants in a body of water.

As shown in FIG. 2, the trench 132 may be a recessed portion on the floor 134 of a body of water 10. The trench 132 may be dug into the floor 134 of the body of water 10. As shown in FIG. 2, the body of water 10 covers the trench 132, and contaminated sediment 24 enters the trench 132. The trench 132 is proximate to the erosion barrier 210, which is proximate to the first land mass 120. As illustrated, the trench 132 is a circular shape, however, it should be appreciated that the trench 132 may be produced in other shapes and such variations are within the spirit and scope of the claimed invention.

The trench 132 defines a sediment trap 130 on a floor 134 of the body of water 10. The sediment trap 130 is located outside the first land mass 110 and is configured for collecting sediment. In a body of water that is contaminated, the sediment is generally contaminated sediment 24. In some embodiments, the contaminated sediment 24 includes phosphorous as one of the contaminants. As discussed in greater detail below, a first pumping system is used to pump contaminated sediment 24 from the floor 134 of the body of water 10 to the central area 170.

Greater depths may be problematic for contaminant accumulation, such as the accumulation of phosphorous. For instance, greater depths of water may have lower levels of dissolved oxygen and/or high turbidity, and these characteristics may make deeper parts of the body of water more likely to have higher levels of contamination. Thus, in some embodiments the trench 132 is placed in proximity to the deepest parts of the body of water 10. As will be described in greater detail below, contaminated sediment 24 is pumped from the sediment trap 130 to the central area 170 via conduit 180. As noted above, due to the increased contamination in the contaminated sediment 24, the contamination (e.g., phosphorous) is beneficial for sustaining natural life when repurposed in the central area 170. Nonetheless, a majority of contaminated sediment 24 may be effectively sequestered inside the central area 170 by permanently successively depositing the sediment in the central area 170.

Methods for reducing contaminants from a body of water may thus include collecting contaminated sediment 24 and water in a trench 132 on a floor 134 of the body of water, the trench 132 being described as in any of the above-described embodiments. The amount of contaminated sediment 24 and water, or the relative proportion, may be controlled by a sensor that adjusts the height of the inlet head 320 of the conduit 180, as described in greater detail below.

ii. Erosion Barrier

The erosion barrier 210 is disposed outside the first land mass 110. As shown in FIG. 2, the base of the erosion barrier 210 emerges above the water level of the body of water 10. As illustrated, the erosion barrier 210 is at a lower elevation than the first land mass 110. Other arrangements, such as nearly equal elevations of the erosion barrier 210 and first land mass 110, or an erosion barrier 210 of a higher elevation than the first land mass 110, may similarly be used. The elevation of the erosion barrier 210 may be selected based on known qualities of the body of water, such as the height of waves that are expected to crash into the erosion barrier 210. The erosion barrier 210 is always contact with the body of water. Furthermore, the water 212 contained inside the erosion barrier 210 may be used as a source of backwash water utilized by egress conduit 190 to backwash the bed medium 164 (described below). As implied by the name, the erosion barrier 210 helps protect the system 100 from erosion, specifically the first land mass 110. The term, "erosion" refers to the action of surface processes (such as water flow or wind) that removes soil, rock, or dissolved material from one location, and then transports it to another location.

In some embodiments, a method comprises reducing erosion of the first land mass 110 disposing an erosion barrier 210 between the first land mass 110 and the trench 132. The erosion barrier 210 may be made of a sturdy material, such as limestone. However, other suitable materials such as gravel, clay, cement, and combinations thereof (including combinations with limestone) may also be used. The erosion barrier 210 may also filter sediment in the water from the diffusion zone 212. For instance, various natural life forms (e.g., aquatic filter feeders such as sponges, mollusks, among others) may be housed inside the erosion barrier 210, and these life forms may utilize the sediment and/or nutrients dissolved in the water to sustain themselves. In this way, the erosion barrier 210 may act as another form of filtration and decontamination of the contaminated sediment 24 that is sent to the central area 170. For at least this reason, the erosion barrier 210 is preferably constructed of a permeable material. Compacted materials having an insignificant permeability, such as clay, are not preferred construction materials. Thus, materials other than the aforementioned gravel and cement may be used and may provide substantially equivalent results without departing from the spirit and scope of the invention.

In some embodiments, the erosion barrier 210 defines a corrugated shaped limestone mass. The term, "corrugated shaped" refers to a structure having regularly repeating structure of convex portions and concave portions. For instance, as shown in FIG. 1c, the corrugated shaped structure 211 may also contribute to the erosion-preventing properties of the erosion barrier 210, for instance, by helping break waves that reach the erosion barrier 210. As noted above, the erosion barrier 210 may also be permeable to water. Due to the permeability, the erosion barrier 210 may allow water (e.g., filtered water, purified water) to drain back into the body of water. Natural life that is embedded (e.g., housed) inside the erosion barrier 210 and the erosion barrier 210 itself may utilize the nutrients in the sediment and thus may contribute to the filtration and purification of the body of water 10.

iii. First Land Mass

The first land mass 110 encloses the lagoon 120 and generally defines a first enclosed area 112 within the body of water 10. The system 100 structure is generally circular, i.e., each system, overall, has a generally circular shape (e.g., oval, ellipsoidal, ring). The first land mass 110 is also generally circular and may define a ring shape. By analogy, the first land mass 110 is the metal band of the ring, and the void space of the metal band defines the first enclosed area 112.

As illustrated, the first land mass 110 has a portion that is above the level of the body of water 10, and a portion that is below the level of the body of water 10. In this way, the first land mass 110 extends from the highest elevation point of the land mass 110 and toward the trench 132. The first land mass 110 also extends, in the opposite direction, towards the tussock mass area 140. The first land mass 110 may consist of a material that is different from the floor 134 of the body of water 10. However, it may be advantageous to build the first land mass 110 out of materials that are local to the body of water 10. Thus, in some embodiments the first land mass 110 includes a material that is similar to the floor 134 of the body of water 10. In this regard, the first land mass 110 material may have lower level of contamination than the material that makes up the floor 134 of the body of water 10. In some embodiments, the first land mass 110 consists of the same material that is dug out of the floor 134 to construct the trench 132. Moreover, the contaminated sediment 24 that is deposited into the central area 170 may be decontaminated after having been utilized by natural life forms. However, portions of the sediment may not be decontaminated (e.g., at the deepest parts of the lagoon). Thus, the floor of the lagoon 120 may comprise deposited sediment (decontaminated or not). In this regard, FIG. 2 illustrates the floor 134 of the body of water, the first land mass 110 and the floor of the lagoon 120 (e.g., floor of zones 160, 140, 170) as being different (e.g., indicated by the different gradients) for graphical illustration only. It is understood that the differences in materials in these zones may be significant or insignificant without departing from the spirit and scope of the invention.

The erosion barrier 212 and first land mass 110 may define a diffusion zone 212. The lagoon 120 on the opposing side of the first land mass 110 may increase in volume of water due to sediment-containing water being pumped from the trench 132 to the central area 170. When the volume of water in the lagoon 120 exceeds a threshold level, water may passively drain through conduit 190 to the diffusion zone 212. For passive draining, i.e., by hydrostatic pressure, the threshold level is generally defined by an elevation of the water 162 that is greater than the elevation of the water 214 in the diffusion zone 212. When water flows to the diffusion zone 212, a second volume of water 214 may accumulate in the diffusion zone 212. The second volume of water 214 may diffuse and drain back to the body of water 10. In some embodiments, the second volume of water 214 includes purified water (e.g., by filtering out the contaminated sediment) relative to the body of water 10. However, the second volume of water 214 may, at times, include contaminated sediment and/or contaminated water. For instance, in some embodiments a method may include flushing (e.g., backwashing) the bed medium 164 by pumping water from outside the first enclosed area 112 into the first enclosed area 112 through the egress conduit 190. In one embodiment, the second volume of water 214 may be used as backwash water to backwash the bed medium 164. In this regard, a pumping system associated with the egress conduit 190 may pump water from the diffusion zone 212 through the bed medium 164 to dislodge sediment that has accumulated in the bed medium 164 during the normal course of operation. After the backwashing operation, contaminated sediment 24 may flow from the backwash zone 160 into the diffusion zone 212. Thus, at times, the diffusion zone 212 comprises contaminated sediment and/or contaminated water and the water may not be purified relative to the body of water 10.

Nonetheless, on the whole, filtered water is returned to the body of water 10 and ultimately dilutes the contaminant in the body of water. Over time, and with a sufficient area of systems 100, the concentration of the contaminant in the body of water 10 may be reduced.

It is noted that the body of water 10 may be purified of the contaminant(s) by simply sequestering the sediment. In other words, the concentration of the contaminant in the water itself (e.g., dissolved contaminants, such as ions) may not change as significantly when compared to the total change in concentration of the contaminant. That is, the total concentration that includes the dissolved contaminant concentration and the concentration of solid forms of the contaminant, such as those found in the sediment. In some embodiments, the harmful effects are largely caused by the contaminant are due to the contaminant found in the sediment instead of the dissolved contaminant. For instance, resuspension events (e.g., natural weather events such as storms) may suspend the contaminated sediment 24. Resuspension of the sediment from the high turbidity, low dissolved oxygen environment of the bed of the body of water, into the relatively more oxygen-rich environments nearer the surface of the body of water may cause HABs.

iv. Backwash Zone

The backwash zone 160 is positioned between the tussock mass area 140 and the first land mass 110. During the light-cycle, water is pumped through conduit 180 to the central area 170. The accumulated water and sediment flood the first enclosed area 112, and with time the contaminated sediment 24 is deposited as sediment 14. As briefly discussed above, the deposited sediment 14 may become biologically utilized. However, early in the lifetime of the system 100, the majority of the sediment 14 may settle to form the floor of the first enclosed area 112 without the contaminant having been biologically utilized. As the central area 170 becomes a marsh, the deposited sediment may be exposed to more sunlight and dissolved oxygen, thus being more likely to be utilized by natural life forms such as plants. In these uppermost layers of deposited sediment, the sediment may effectively be decontaminated by the natural life, whereas the layers beneath may not. Nonetheless, a significant amount of the contaminant may be sequestered underneath the uppermost layers of deposited sediment, thereby eliminating the risk that the sediment poses to the body of water 10 (e.g., for causing HABs).

Due to the water being pumped to the central area 170 during the light-cycle, the backwash zone 160 generally comprises a volume of water 162. The volume of water 162 may be decontaminated. For instance, the volume of water 162 may have a lower concentration of sediment and thus a lower concentration of the contaminant. Moreover, the volume of water 162 may have a lower concentration of dissolved contaminant. However, further decontamination may be desired before the water is returned to the body of water 10 by diffusion. Thus, in some embodiments the system 100 comprises a bed medium 164. The bed medium 164 may comprise a solid material that adsorbs phosphorous (e.g., phosphates). Moreover, the bed medium 164 may accumulate sediment. In some embodiments, the bed medium 164 comprises carbonaceous aggregate. In some embodiments, the carbonaceous aggregate may be configured to filter mud and contaminants (e.g., phosphorus). The methods described herein may also therefore include filtering water entering into a first end of the egress conduit 190 using a bed medium 164 comprising carbonaceous aggregate, wherein the first end of the egress conduit 190 is embedded in the bed medium 164.

v. Tussock Mass Area

The tussock mass area 140 is enclosed by the first land mass 110. The term, "tussock mass area" as used herein means a region inside a system comprising deposited sediment and having vegetation, the region being enclosed by a backwash zone 160 and the region enclosing a central area 170. In some embodiments and as illustrated in the figures, the tussock mass area 140 may include an inner berm 142 and an outer berm 144 that defines the inner and outer perimeter of the tussock mass area 140.

The tussock mass area 140 is thus generally configured for collecting sediment 14. The contaminated sediment 24 ultimately settles into any of the zones in the first enclosed area 112. A reduced amount of sediment may accumulate in the backwash zone 160 relative to the central area 170. Nonetheless, at least some sediment may accumulate in the tussock area 170. The sediment 14 may be rich in nutrients such as phosphorous and may support natural life.

Figure 4A:
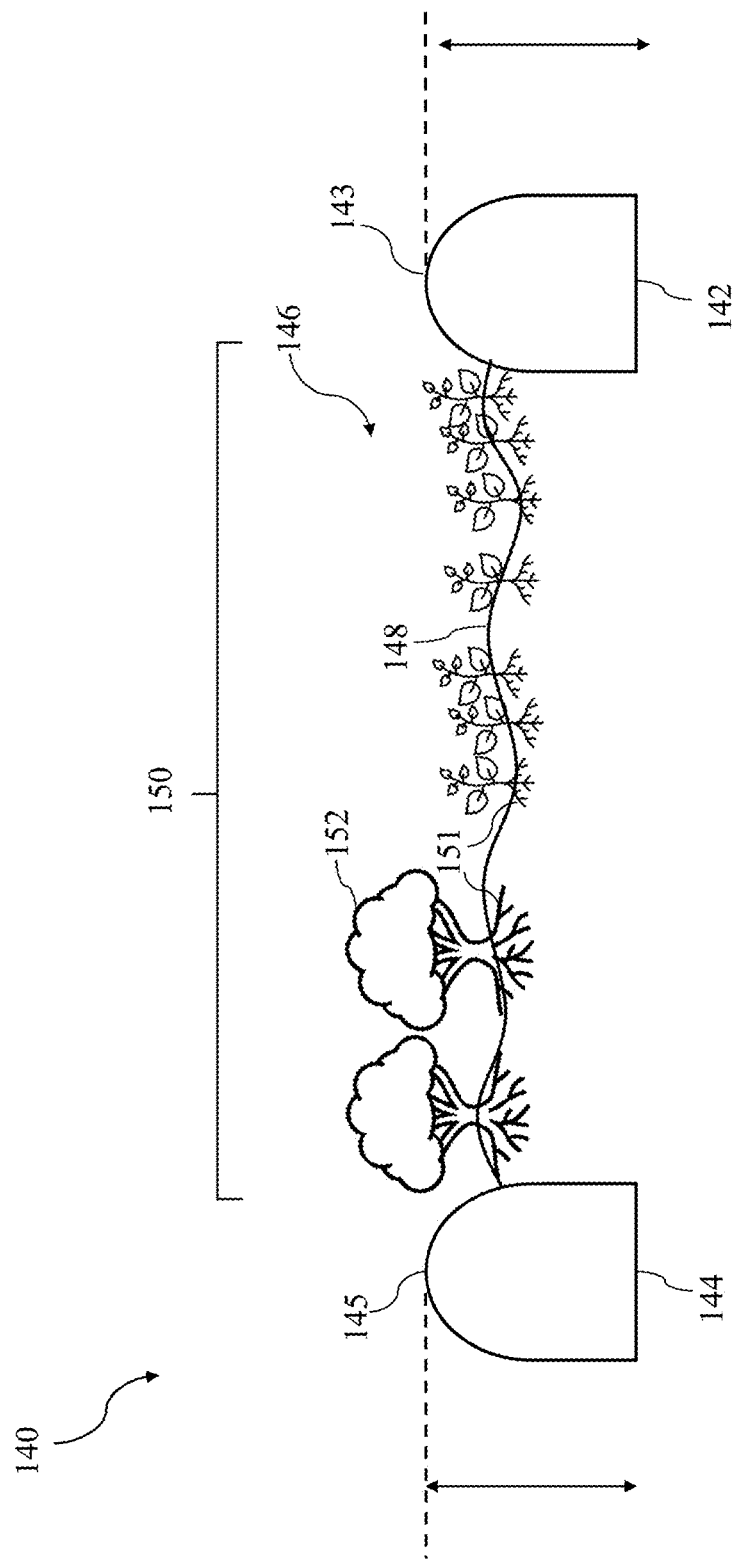
FIG. 4a is a side-view perspective diagram of a tussock area of an example system for reducing contaminants in a body of water.

With reference to FIGS. 2 and 4a, the tussock mass area 140 may include an inner berm 142 and an outer berm 144. The term, "berm" as used herein means a raised barrier, the barrier being a higher elevation than the land and/or water in contact with the berm. For instance, the tussock mass area 140 includes an inner berm 142 and an outer berm 144. A land mass 150 and/or water may be enclosed by the two berms 142, 144 (e.g., depending on the age of the system). On the outer side of the outer berm 144, the outer berm 144 is in contact with water 162. The inner berm 142 may be in contact with the watery area, marshy area, or marsh found in the central area 170 (e.g., depending on the age of the system). Regardless, the land and/or water in contact with the berm is at a lower elevation. In this way, the berms 142, 144 act as an embankment that defines a space to contain water and/or a second land mass 150 (e.g., deposited sediment).

The inner tussock berm 142 and outer tussock berm 144 may have a top end (143, 145) that is above a daily low point level. The daily low point level is a local minima of the elevation of the third volume of water 148 present in the tussock mass area 140. The berms 142, 144) may be constructed of a suitable material, such as, limestone rock.

However, other materials may be used to substantially the same effect. The berms (142, 144) may provide structure that aids in settling the sediment 14 in the central area 170. However, as described above sediment may accumulate in the tussock mass area 140 and the backwash zone 160. In this regard, the tussock mass area 140 may be configured for building a second land mass 150 as shown in FIG. 4a. The second land mass may include roots 151 and trees 152.

In some embodiments, the vegetation 146 comprises a plurality of pond apple trees (*Annona glabra*). This species of tree may be preferred because it may thrive in high nutrient (e.g., high phosphorous) conditions. Moreover, the species may be more tolerant to cycles of flooding. The stem and root of the pond apple tree is also buoyant, allowing the species to regulate its' own buoyancy and offset the weight of overwater growth. Lastly, the fruit and seeds of the species float. Thus, the species may germinate additional pond apple trees throughout the system.

Figure 4B:
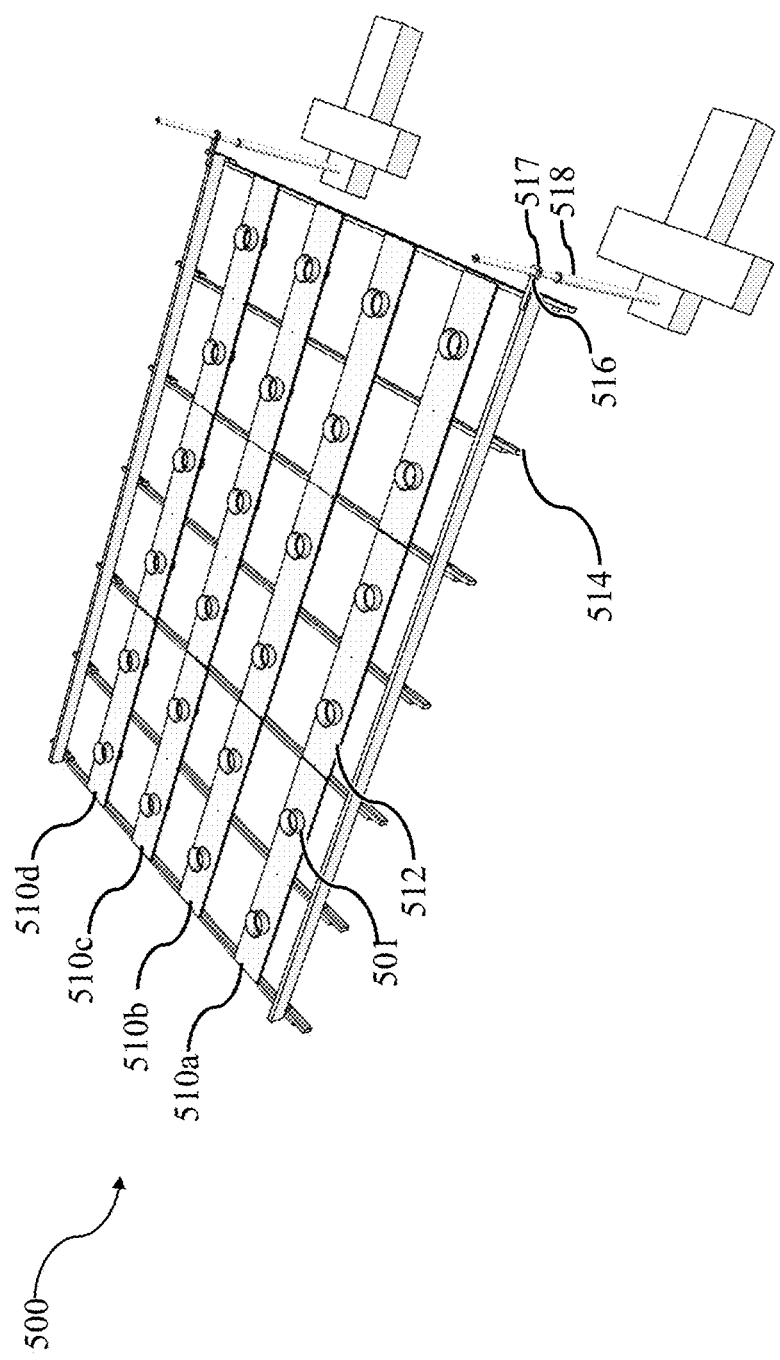
FIG. 4b is a perspective view of a tussock raft structure according to an example embodiment.

After the construction of each system 100, the first enclosed area 112 may not have a proliferation of natural life. To facilitate the growth of the pond apple trees, a tussock raft structure 500 may be used, such as the tussock raft structure 500 embodiments shown in FIGS. 4b and 4c. As illustrated, the structure 500 includes a row of housings 510a-510d to house the young pond apple trees (or equivalent). As illustrated, the row of housings 510a-510d include a plurality of housings 501 having a shape similar to a planting pot. Each row of housings 510a-510d may include a plurality of housing panels 512 having a planar structure and void space to accommodate each housing 501. As illustrated, there are two housings in each support structure 512. The housing panels 512 are attached to a plurality of support structures 514 placed perpendicular to and below the housing panels 512. The structure 500 also includes a piling support structure 516 running parallel to the housing panels 512 and above the support structures 512. A piling support structure 516 is found on both the distal and proximate sides of the structure 500. The piling support structure 516 includes an opening 517 to receive a pile 518 secure the structure in the tussock mass area 140. The opening 517 allows for the piling support structure 516 to be secured to the pile 518 horizontally yet allows for the structure 500 to move up and down with the water level inside the tussock mass area 140. As shown in the side-view perspective of FIG. 4d, the tussock raft structure 500 abuts the outer berm 144. The pile 518 is located on the opposing side of the tussock raft structure 500.

Figure 4C:
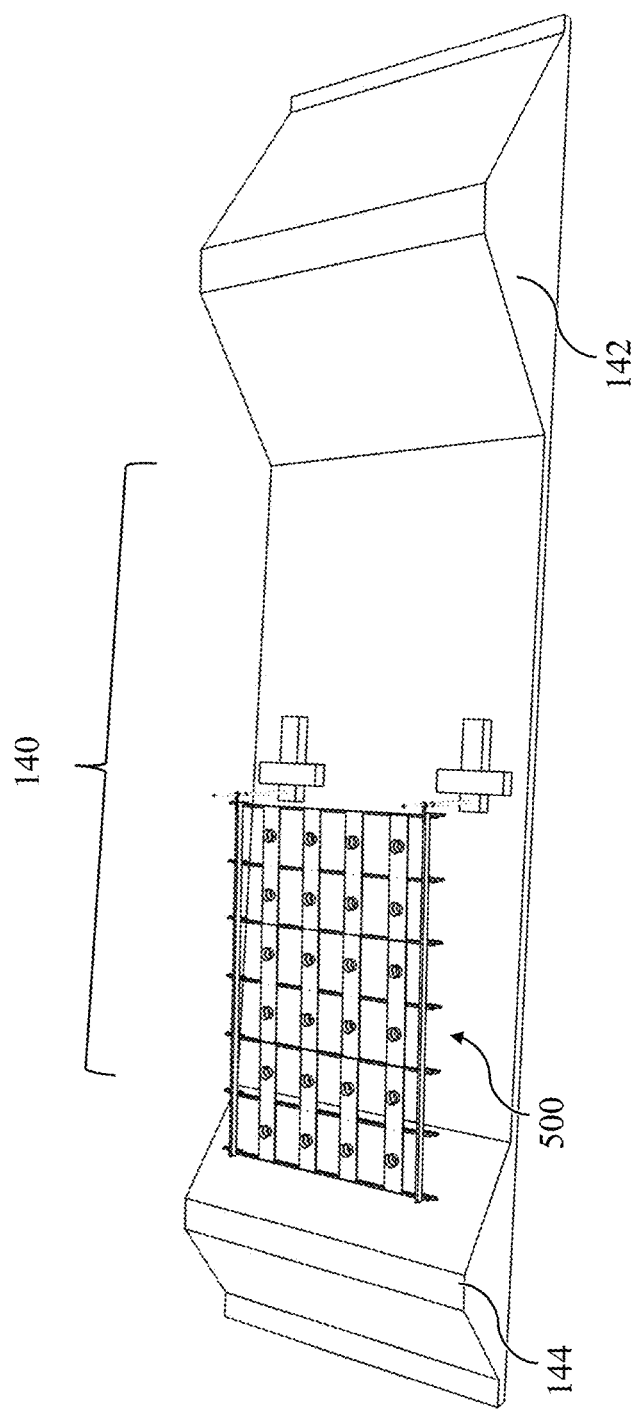
FIG. 4c is a perspective view of a system for reducing contaminants in a body of water, further illustrating the tussock raft structure of FIG. 4b.
Figure 4D:
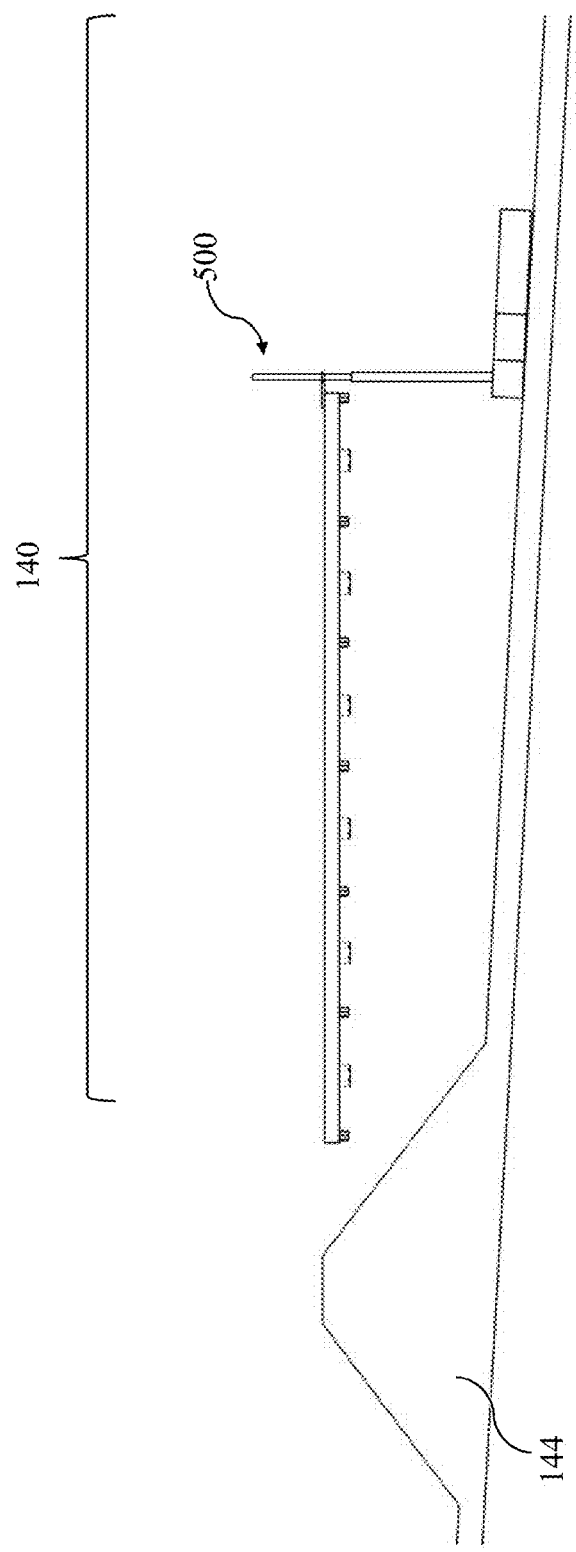
FIG. 4d is a side view of a system for reducing contaminants in a body of water shown in FIG. 4c, further illustrating the tussock raft structure of FIG. 4b.

The tussock raft structure 500 is further illustrated in FIG. 4c. As illustrated in FIG. 4c, the tussock raft structure 500 is abutted with and enclosed by the outer berm 144. As illustrated, a single tussock raft structure 500 is shown. However, a plurality of tussock raft structures 500 may be used. For instance, the perimeter of the tussock mass area 140 may consist of tussock raft structures 500.

vi. Central Area

The central area 170 is surrounded by the tussock mass area 140. The central area 170 may be configured for removal of contaminants from contaminated sediment 24. Moreover, the central area 170 may not utilize the contaminants, but may sequester them in layers-upon-layers of deposited contaminant sediment. As the amount of sediment increases, the central area 170 may become a marsh. The uppermost layers of contaminated sediment may be biologically productive and help support an ecosystem. However, the majority of the contaminants are sequestered in the deposited sediment layers. Thus, the methods described herein may include pumping, through an ingress conduit 180, contaminated sediment 24 and water 10 from outside the first enclosed area 112 (e.g., the body of water 10, to a central area 170 within the first enclosed area 112. After pumping the contaminated sediment 24 during the light-cycle, the contaminated sediment will naturally settle. Thus, the methods may further include allowing settling of the contaminated sediment in the central area 170, such that the contaminants in the contaminated sediment accumulate within the first enclosed area 112.

In this regard, after the construction of the system 100, the first enclosed area 112 generally includes man-made berms 142 and 144 in the tussock mass area 140 and described above. An additional berm 171 may be present in the central area 170. In some embodiments, the additional berm 171 is separate from the inner berm 142. In some embodiments, the additional berm 171 is a continuation of the inner berm 142, for instance, in the half ring embodiment described above where the half ring system connects with a shore.

Shortly after the construction of the system 100, the volume defined by the first enclosed area 112 predominately comprises water because an insufficient amount of contaminated sediment 24 has been allowed to settle. Thus, early in the systems' 100 life, the central area 170 may be a watery area. The watery area may comprise the contaminated sediment, the water, and with a relatively low amount of natural life. With repeated light-cycles and dark-cycles, the first enclosed area 112 will accumulate sediment. Specifically, the central area 170 may accumulate a majority of the sediment. As the sediment accumulates, layer-upon-layer, the sediment forms a land mass. Eventually, the freshly deposited layers of contaminated sediment approach the water height in the central area 170, exposing the freshly deposited layers of contaminated sediment to an increasing amount of sunlight and dissolved oxygen. As the deposited sediment experiences more sunlight and dissolved oxygen, natural life will naturally proliferate. In this way, the methods described herein may include removing contaminants within the first enclosed area 112 (e.g., at least the central area 170 with vegetation disposed within the first enclosed area 112). In sum, the deposited layers of contaminated sediment may become biologically productive and the central area 170 may become a marsh. Prior to becoming a marsh, the central area 170 may be a marshy area, having some of the characteristics of the watery area and some of the characteristics of the marsh.

The term, "marsh" as used herein means an area of low-lying land having vegetation inside a system that is repeatedly flooded and is waterlogged. The low-lying land is generally deposited sediment that has been taken from trench 132 and deposited in the central area 170. With a sufficient number of light-cycles and dark-cycles, the sediment layers build-up, layer-upon-layer, until the sediment level reaches a height that is near the surface of water. When the sediment level reaches near the surface of the water, the sediment is exposed to an increased amount of sunlight and dissolved oxygen. The increased sunlight and dissolved oxygen may facilitate the growth of the vegetation and the conversion of a previously watery area or marshy area into a marsh.

The term, "marshy area" refers to an area having characteristics of a marsh and a watery area. For instance, a marshy area may have an area of low-lying land, but due to an insufficient amount of time, sunlight, and/or dissolved oxygen, may not include vegetation.

The term, "watery area" as used herein means a central area 170 within a system that is predominately comprised of water and having at least some deposited sediment from the trench 132 at the bottom of the central area 170.

The evolution of the central area 170 over time is an example of adapted management of the contaminants. Shortly after the construction, the contaminants in the sediment are not biologically utilized, rather the contaminants are merely sequestered in the first enclosed area 112. Eventually, the deposited contaminated sediment becomes biologically useful and the management of the contaminant shifts from sequestration to utilization. Thus, the described methods and systems allow for an adapted management of the contaminants that provides constant maintenance for the body of water. In other words, the system sand methods allow for both existing contaminants in the body of water and constant sources of contaminants (e.g., agricultural runoff) to be maintained, thereby reducing the concentration of contaminants in the body of water and reducing the likelihood of harmful effects of the contaminants, such as HABs.

As described above, the central area 170 receives contaminated sediment 24, and the sediment ultimately forms a land mass, such as a marshy area or a marsh. Thus, the central area 170 may have a sediment capacity. The volume of the central area 170 may be roughly calculated using the equation for a cylinder, i.e., $V=0.5\pi*D^2*h$, where V is the volume, D is the diameter, and h is the height. Thus, the sediment capacity of the central area 170 is proportional to the height (h) of the central area 170. As sediment accumulates, the height of the sediment increases as the height of the second land mass 150 increases. Thus, the sediment capacity is proportional to the elevation of the second land mass 150. In this regard, the contaminant-removal potential of the system 100 is proportional to the height of the central area 170, and proportional to the squared diameter.

Prior to the construction of each system, the sediment removal capacity may be evaluated based on the relationship described above. The design of each system 100 may change depending on the sediment removal capacity needs of the body of water 10. Although the sediment removal capacity may not be changed substantially after the construction of the system 100, design parameters such as the elevation of each zone the diameter of each zone may be considered to meet the contaminant-removal potential needs of the particular body of water 10.

vii. Diffusion Zone

The system 100 also may include a diffusion zone 212 disposed between the erosion barrier 210 and the first land mass 110. Generally, the diffusion zone 212 comprises a second volume of water 214. As noted above, the diffusion zone 212 passively receives water from the backwash zone 160 when the height of the volume of water 162 exceeds the height of the water 214 in the diffusion zone 212. Furthermore, as noted above, the erosion barrier 210 may be permeable, thus allowing purified water to wash back into the body of water 10.

The diffusion zone 212 may also be a suitable area for placing solar panels to produce energy for the electrical machinery described below. Thus, in some embodiments, the diffusion zone 212 includes a plurality of solar panels. As noted above, the water 214 in the diffusion zone 212 may be used to backwash the bed medium 164. Specifically, the bed medium 164 may be backwashed (e.g., flushed) during the light-cycle using power from solar panels.

viii. Exemplary Embodiment

The systems and methods described herein are envisioned as being implemented in Lake Okeechobee of the state of Florida. The diameter of each system as measured by the diameter of the center of the trench may be, for instance, approximately 2500 meters in diameter. The total volume of the trench may be 6000 meters cubed. The elevation depth of the trench in the body of water may be around 5 meters below to the lowest point(s) in Lake Okeechobee.

In the exemplary embodiment, the contaminated sediment may be a thixotropic mud found at the bottom of Lake Okeechobee. The contaminant is phosphorous in the form of dissolved phosphorous and solid phosphorous found in the thixotropic mud.

In the exemplary embodiment, the diameter of the first land mass 110 may be 1800 meters. The material to construct the first land mass 110 includes the repurposed material that was removed during construction of the trench. Thus, in some embodiments the materials for building the land mass 110 are repurposed from the body of water and/or from the land surrounding the body of water. The material may include a mixture of sand, limestone, and sediment (e.g., from the construction of the trench). Elevations of each zone are given below, and all of the elevations are discussed relative to their distance above or below the floor of Lake Okeechobee. A 12 foot (3.7 meters) nominal water depth has been chosen for the discussion. The elevation of the first land mass may be about 7 meters.

The inner berm 142 and outer berm 144 are constructed of lime stone rock. The elevation of each berm is 4.5 meters. The ingress conduit 180 is made of a high density polyethylene polymer ("HDPE"). The egress conduit 190 is similarly made of HDPE. The bed medium 164 comprises carbonaceous aggregate. The land mass and trench slopes are between about 2% and 3% (disregarding berms) in the exemplary embodiment systems. These low slopes encourage only the finest grains of sediment to enter the low energy conduit system. Larger sediment size may become unsuspended in the pipe and may cause operational problems. Thus, it is important that the slope of the trench to facilitate the transport of preferred finer sediments, excluding the larger sediment. These low natural slopes reduce erosion and promote the proliferation of natural life.

c. Machinery

A plurality of conventional and unconventional engineering structures may be used to produce the systems 100. As mentioned above, conduits (180, 190) are used to transfer material between the described zones. Generally, the first ingress conduit 180 extends from the sediment trap 130 to the central area 170, and the first ingress conduit 180 and the first pumping system are configured for (1) moving the sediment 14 from the sediment trap 130 to the central area 170. The egress conduit 190 extending from the backwash zone 160 to outside the first land mass 110. The preferred material of construction of the conduits is HDPE, however other polymeric materials may be used and are within the spirit and scope of the invention. Generally, the egress conduit 190 passively allows filtered water having a minimal amount of contaminated sediment 24 to move from the backwash zone 160 to outside the first land mass 110. The term, "minimal amount of contaminated sediment" refers to the local minima of sediment disposed in the water, the minima being relative to the other zones in the system 100.

The amount of sediment may be determined, for instance, by measuring the turbidity of the water.

As noted above, the egress conduit 190 may be used to backwash the bed medium 164 using water 214 in the backwash zone 212. The backwashing may be performed by a second pumping system (described below). In this regard, the backwash pumps may be reversible. Should the water level of the water 162 in the backwash zone 160 increase to a level that the pressure head provided by the pump is opposed the passive hydrostatic pressure of the water 162 in the backwash zone 160, the reversible pumps may move water from the backwash zone 160 to the diffusion zone 212. One or more backwashing steps may be performed during each light-cycle, depending on the daily requirements of the system 100.

Moreover, as addressed above, the systems 100 take on a circular shape, such as a ring shape. Each system 100 may include a plurality of the conduits (180, 190), such as the plurality of conduits shown in FIG. 1d. As shown in FIG. 1d, the zones (170, 140, 160, 110, 210, and 132) are shown in dotted lines. The conduits (180, 190) are shown as being on top of the system 100 to illustrate a radially distributed series of pipes. Thus, the systems described herein may include a plurality of first ingress conduits 180 and a plurality of egress conduits 190.

In some embodiments, the system 100 is a circular shape, but only a portion of a full circle is used. For instance, in some embodiments a half of a ring shape may be used. In such embodiments, the inner berm 142 may connect with a shore of the body of water, where the half ring system is disposed in the body of water, and the central area is inland on the shore. In these embodiments, the ends of the half ring shape of the inner berm 142 may connect with the shore, and the shore may be considered the additional berm 171. Alternatively, the shore may be considered as a part of the inner berm 142. Additional embodiments such as quarter-circles, three-quarter circles may be used, depending on the needs of the body of water and the available natural landscape, and such variations are within the spirit and scope of the invention.

Figure 3A:
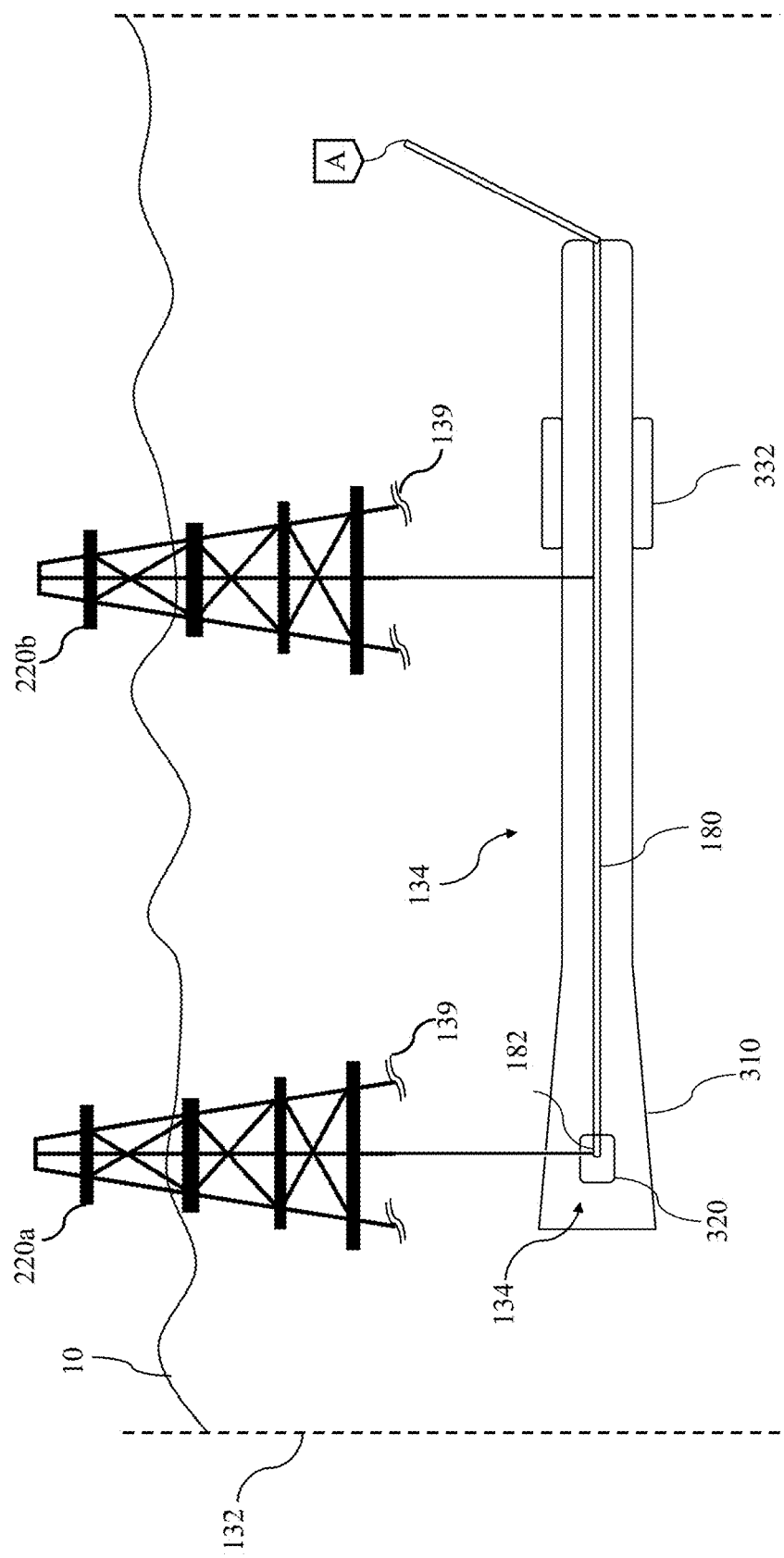
FIG. 3a is a schematic of a portion of an example system for reducing contaminants in a body of water, the schematic illustrating the vertical structures and conduit sheath in a trench of the system.
Figure 3B:
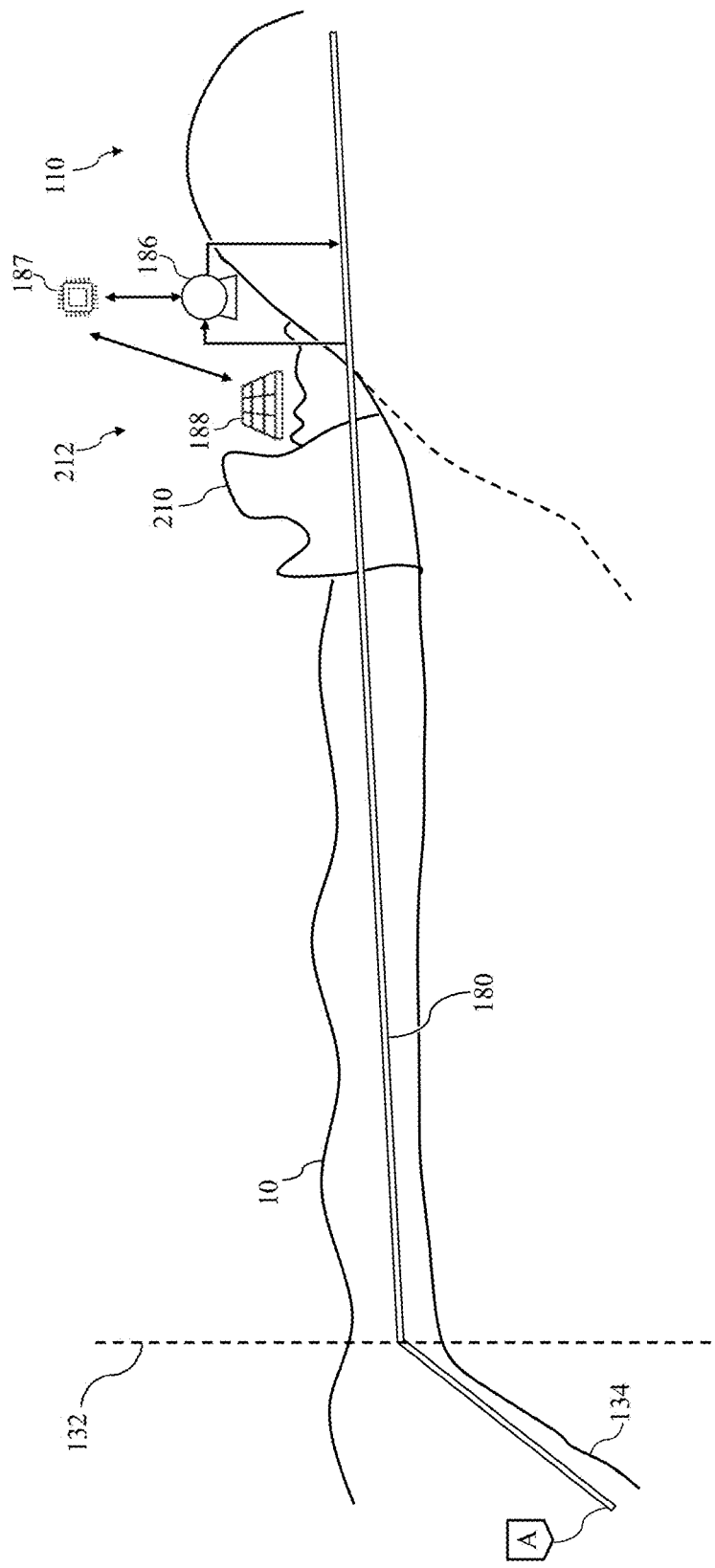
FIG. 3b is a schematic of a portion of an example system for reducing contaminants in a body of water, the schematic illustrating the conduit emerging through the erosion barrier and first land mass, and the associated first pumping system.

With reference to FIG. 2, the illustrated system includes a first ingress conduit 180. The scale and arrangement of conduit 180 is inaccurate on FIG. 2. Rather, FIGS. 3a and 3b provide more accurate schematics of the placement of the conduit 180. For instance, as illustrated in FIG. 3a, conduit 180 is located on the floor 134 of the body of water 10 in the trench 132 defined by the dotted lines. The conduit 180 travels along the floor 134 of the body of water 10 toward the first land mass 110. The conduit 180 is generally free from sharp angles unlike the illustration. Sharp angles (e.g., elbows) may increase the pressure drop across the inlet and outlet of the conduit 180, thereby increasing the energy requirements of the system.

As illustrated in FIG. 3b, continuing from the off-page connector A, the conduit 180 rises out of the trench 132, along the floor 134, until the conduit 180 is outside of the trench 132. Once the conduit 180 is outside of the trench 132, the conduit 180 travels along the floor 134 of the body of water 10 until reaching the erosion barrier 210 or first land mass 110. As illustrated, the conduit 180 is embedded in the erosion barrier 210. The slope of the trench 132, and thus the conduit 180, is generally low, preferably at an angle of at least about 1% and less than about 3-5%. The preferred slope is preferred because at higher slopes the conduit 180 may accumulate unwanted content, such as larger sediment particles. As discussed below, the pumping systems may run on solar power. Solar power may be preferred due to the inherently remote nature of the system 100. However, to efficiently utilize the solar power, the aforementioned low energy conduit systems 180 may be required. If, for instance, an on-demand source of power could be utilized that can provide substantially higher wattage, the slope and angle requirements of the conduit 180 may be less important to the overall design of the conduit 180. Nonetheless, solar power energy production is the preferred means of energy production and low energy slopes and angles of the conduit 180 are envisioned for such means of energy production.

The conduit 180 may be included in a first pumping system. The first pumping system generally comprises a pump 186 in fluid communication with the first ingress conduit 180 and is configured to move water into an inlet 182 of the first ingress conduit 180. The first pumping system may also include a sensor 187 in electrical communication with the pump 186, and a power source 188 for providing power to the pump 186 and sensor 187. The pump 186, sensor 187, and power source 188, may be located in a pumping station found in the diffusion zone 212. The pumping station may include the appropriate equipment for installing the pumping system, such as any scaffolding, support systems, etc. Moreover, the second pumping system for the egress conduit 190 may also be including in the pumping station, and the second pumping system may similarly utilize the power source 188 or a different power source, and combinations thereof.

The sensor 187 may be used to detect a metric of an attribute associated with the pump 186. For instance, the sensor may detect the turbidity of the sediment-containing water being pumped. The sensor may be any type of sensor known in the art for measuring the turbidity. As will be discussed below, the sensor may be used to adjust the structure that controls the amount of sediment in the water. Different and/or additional methods for detecting the amount of sediment in the sediment-containing water may be used. For instance, the flow rate, voltage, pressure, etc. may be used to determine the amount of sediment in the sediment-containing water. Such methods are within the scope and spirit of the invention.

The power source 188 is generally in electrical communication with the pump 186 and/or sensor 187. As illustrated, the power source 188 is a solar panel found in the diffusion zone 212, however, other types of power sources may be used (and in different locations) and are within the spirit and scope of the invention. Moreover, batteries may be connected to the solar panels and may serve as a power source when solar power is not directly available.

The first pumping system may also include a first vertical structure 220a positioned at a first location near the inlet 182 of the first ingress conduit 180, as illustrated in the schematics shown by FIGS. 2 and 3a. The illustrated first vertical structure 220a is a derrick. The hashing 139 is included in the figures to convey that the bottom of each vertical structure (220a, 220b) is secured to the floor 134 of the body of water 10. Moreover, the first vertical structure 220a may have a portion that is above the water level of the body of water 10 and a portion that is below the water level. The first vertical structure 220a is not limited to a derrick, or a derrick-like construction. Other structures may be used and are within the spirit and scope of the invention (see e.g., the discussion below in relation to FIG. 5). Furthermore, the first vertical structure 220a may be fully submerged under water, depending on the needs of the system 100 and the regulations of the local, national, and/or regional governing bodies.

Figure 3C:
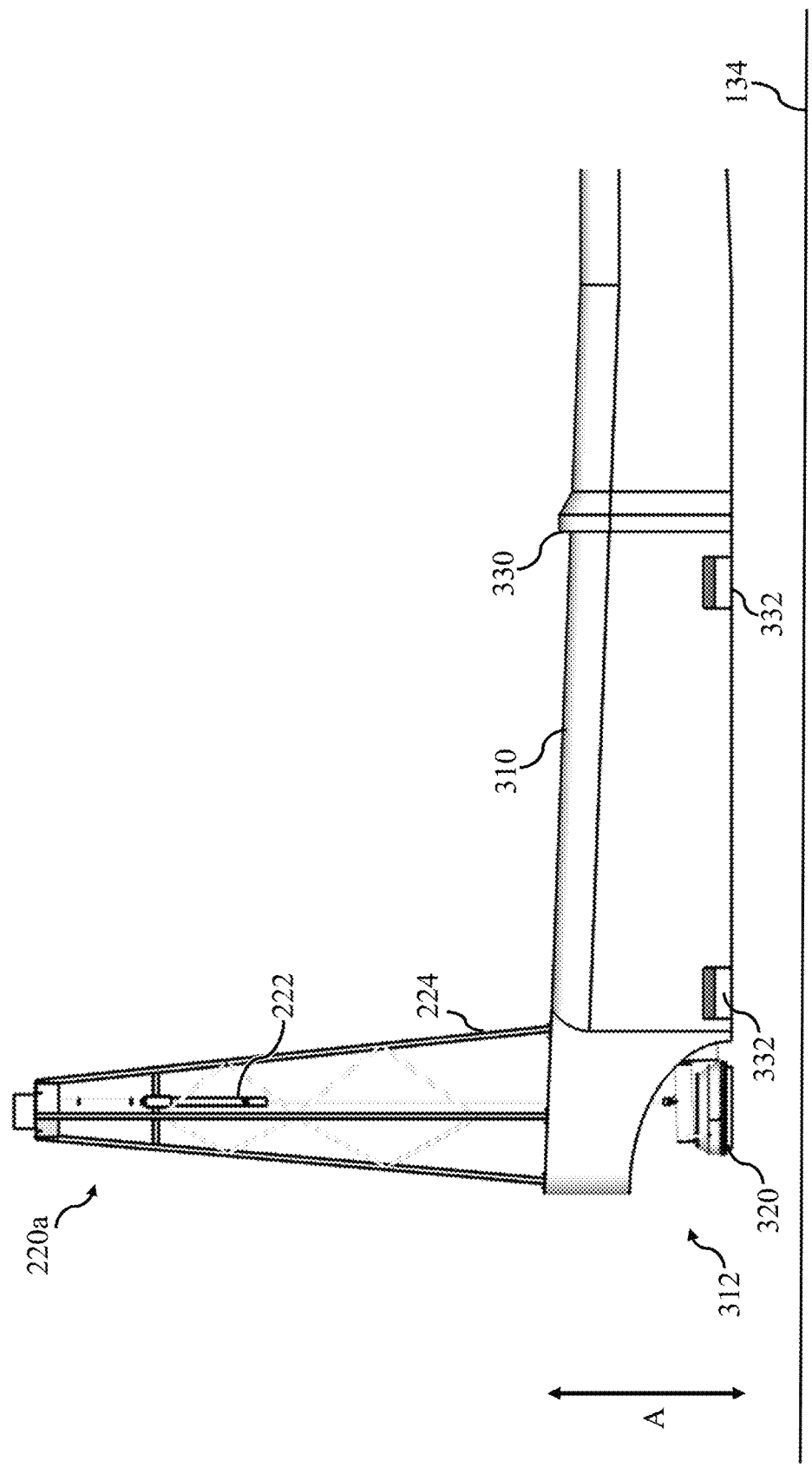
FIG. 3c is a side-view of the inlet end of an ingress conduit enclosed by a conduit sheath according to an example embodiment.

The vertical structure(s) may be secured to the floor 134 directly, or indirectly. As shown in FIG. 3c, the first vertical structure 220a is secured to the floor 134 indirectly, via the conduit sheath 310. The sheath 310 may protect only a portion of the conduit 180. For instance, because the conduit 180 is most mobile at the inlet end 182 where the first vertical structure 220a moves the conduit 180 via the inlet head 320. As illustrated, the first vertical structure 220a has a plurality of legs 224. In the central portion of the first vertical structure 220a, there exists a first arm 222. The first arm 222 connects a first portion of the first ingress conduit 180 to the first vertical structure 220 and is used to move the inlet head 320. The design of the inlet head 320 is described in greater detail below. Nonetheless, the described structure is used for controlling the amount of sediment that is delivered to the central area 170. By action of the first arm 222, the inlet head 320 can be moved up or down as illustrated by line A. The amount of sediment in the water that is pumped to the central area 170 can be adjusted, based on the measured metric of the attribute associated with the pump 186 provided by the sensor 187, by adjusting the height of the inlet head 320.

Figure 3D:
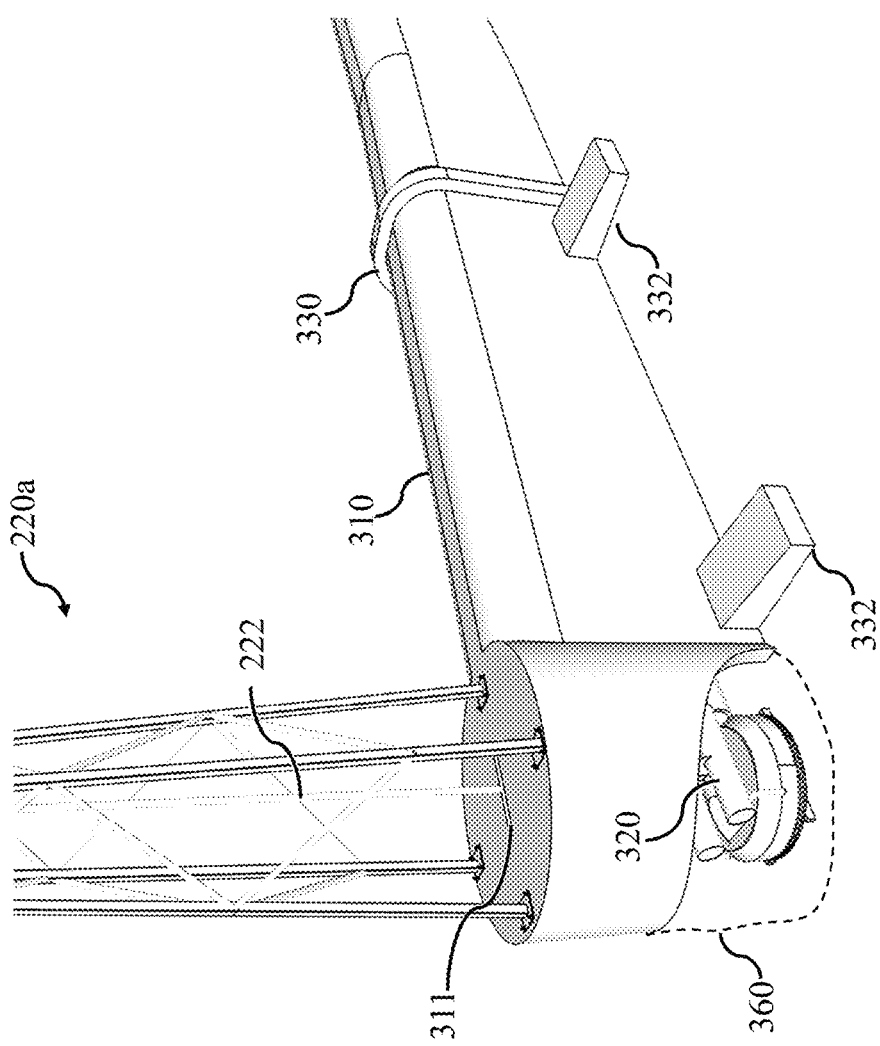
FIG. 3d is a zoomed-in perspective view of the inlet end of the conduit shown in FIG. 3c.
Figure 3E:
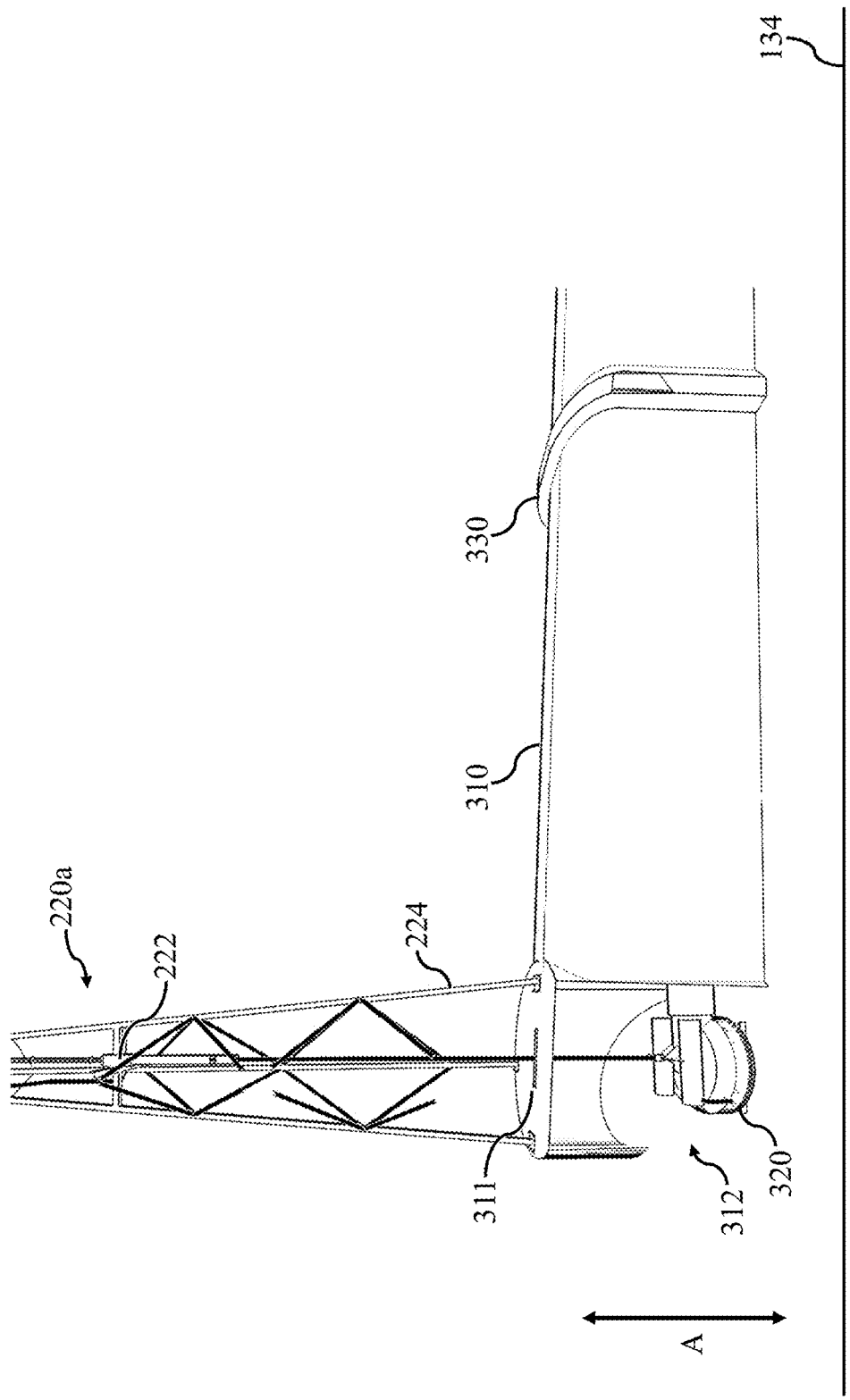
FIG. 3e is a cutaway wireframe view of the inlet end of the ingress conduit enclosed by the conduit sheath of FIG. 3c.
Figure 3F:
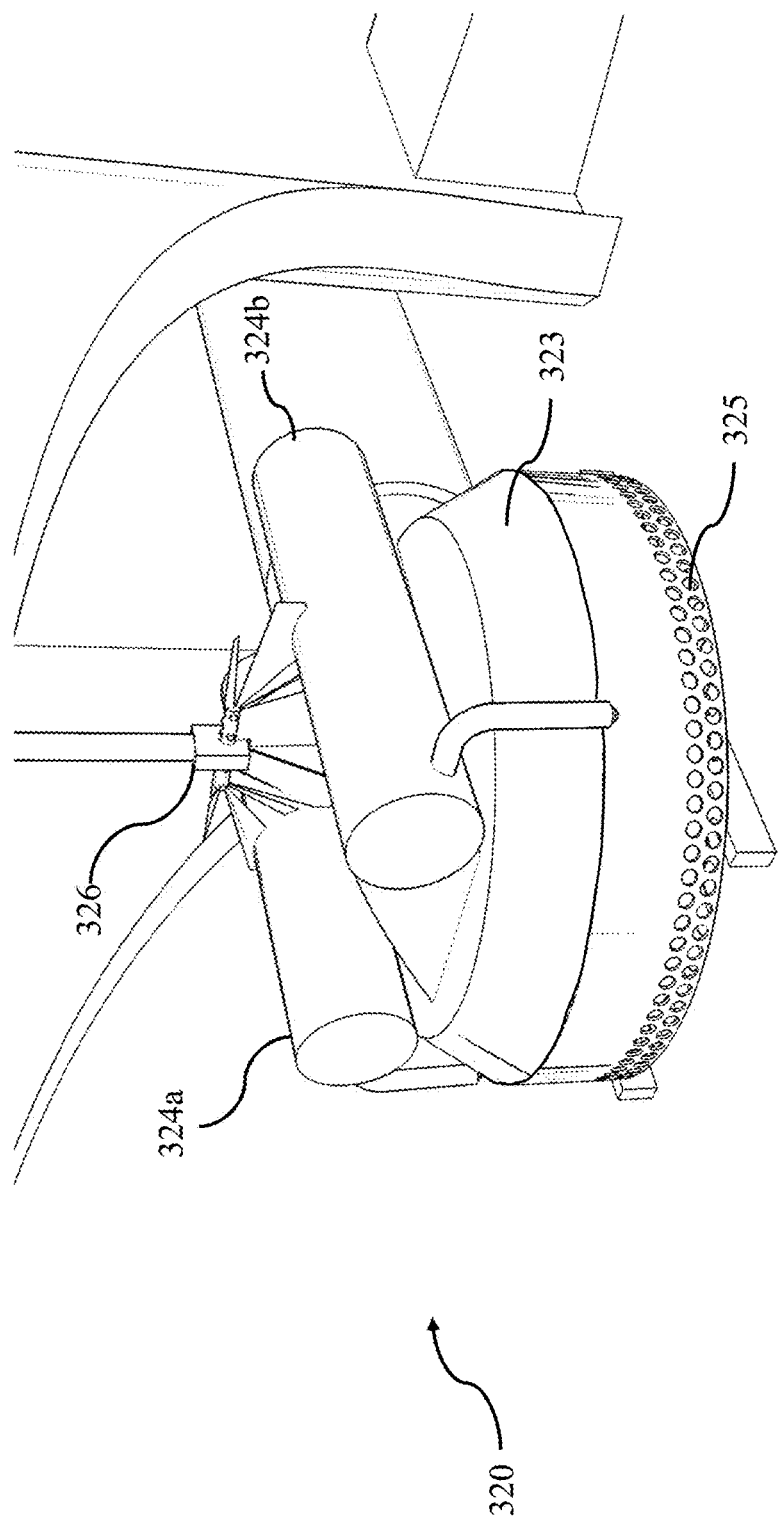
FIG. 3f is a zoomed-in perspective view of an inlet head of an ingress conduit.
Figure 3G:
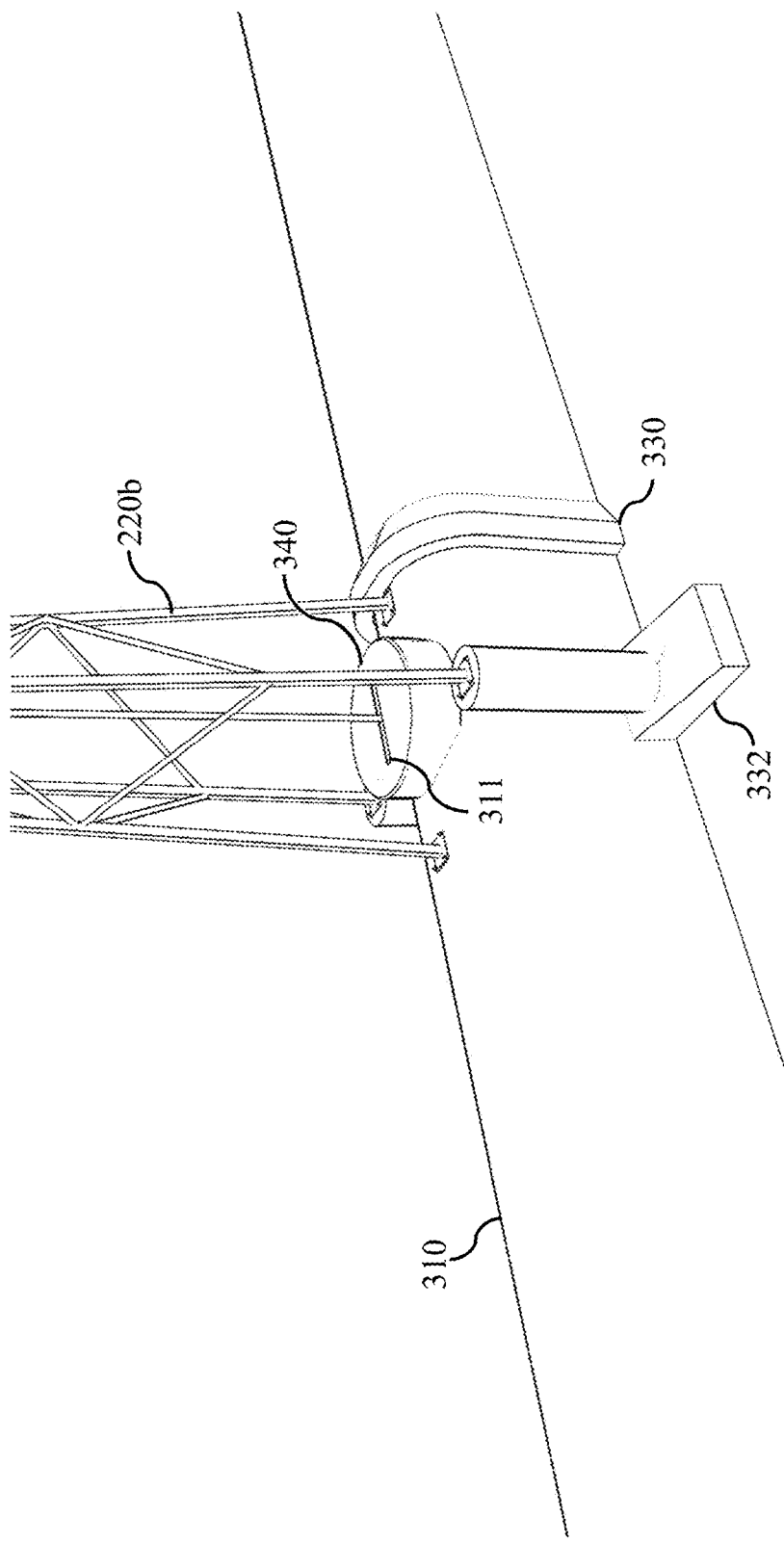
FIG. 3g is a zoomed-in perspective view of a second vertical structure, illustrating the removable manhole on the conduit sheath.
Figure 3H:
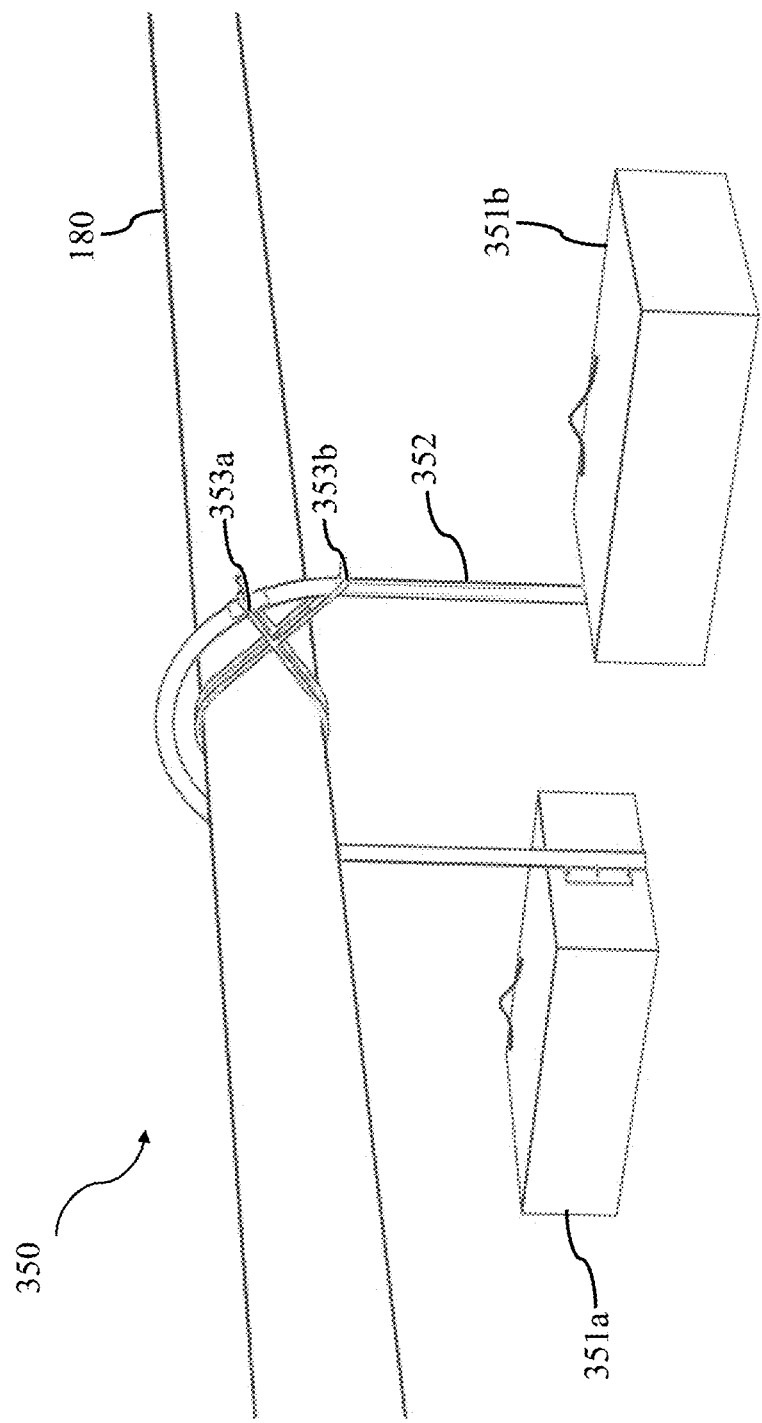
FIG. 3h is a perspective view of a stabilizing element that may be used to stabilize the ingress conduit along the bed of a body of water, according to an example embodiment.
Figure 3I:
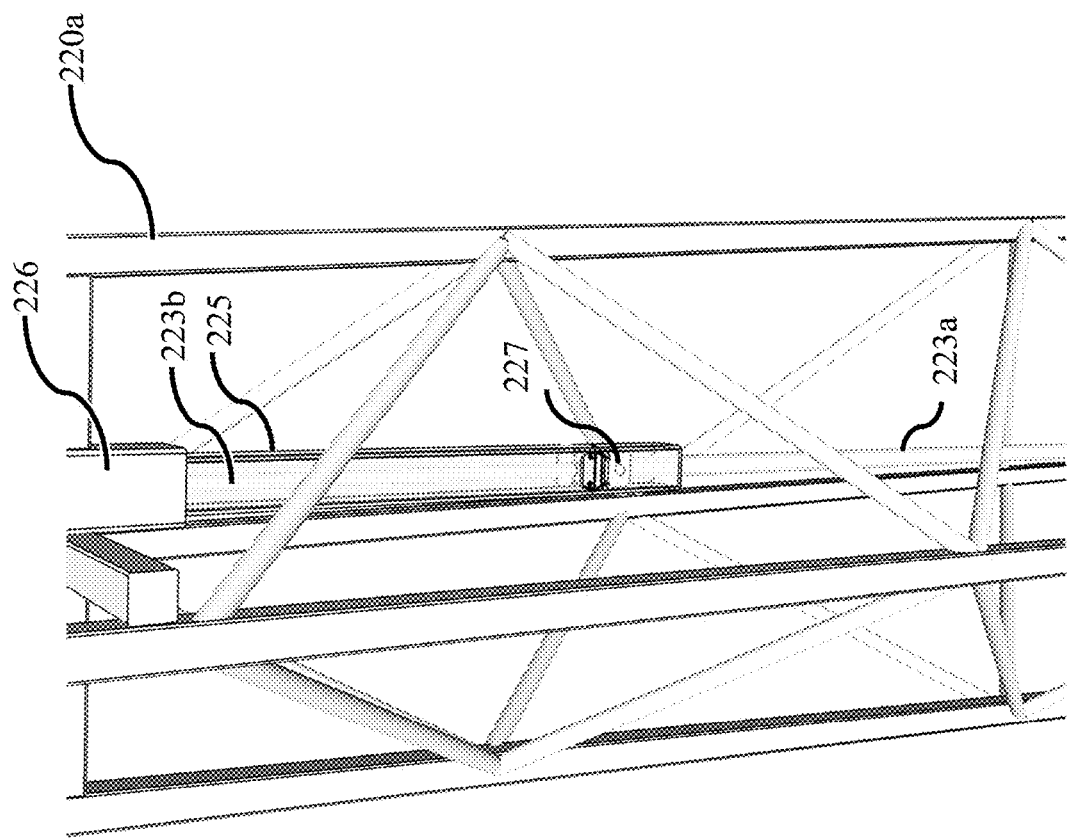
FIG. 3i is a zoomed-in perspective of a first vertical structure illustrating the housing, joint, first arm, and bushing of the structure for moving the inlet head of the conduit up and down.

Referring now specifically to FIG. 3i, a portion of the first vertical structure 220a is shown. the first arm 222 may comprise an elongated member (223a and 223b), a joint 227, a bushing 225 inside of sleeve 226. The elongated member may be a rod, for instance, that has a first portion 223a at a location proximate the inlet head 320 and a second portion 223b attaching the first arm 222 to top of the first vertical structure 220a. The second portion 223b is enclosed by the bushing 225, and the bushing 225 further encloses the joint 227. The bushing 225 is shown as being outside of the sleeve 226, however it is understood that during operation the bushing 225 is inside the sleeve 226. The joint 227 allows for the inlet head 320 to move up and down while accommodating the range of motion of the first portion 223a. Thus, the joint 227 helps in reducing the stresses on the system, for instance, on the hydraulic piston atop the structure (not illustrated). However, as shown by FIG. 3c-3e, the conduit sheath 310 also includes a slot hole 311 that accommodates the range of motion, while still allowing for the inlet head 320 and conduit 180 to be protected by the sheath 310.

As the inlet head 320 is adjusted up and down, the conduit 180 also moves up and down. The conduit 180 may have flexible properties to allow the pipe to move up and down without fracturing or causing unnecessary stress on the conduit 180. Nonetheless, objects that might obstruct the movement of the conduit 180 might also damage the conduit when it is adjusted. Thus, the conduit 180 may be protected by using a conduit sheath 310. The conduit sheath 310 may have an opening 312 at the inlet head 320 that allows for an operator to inspect the inlet head 320 and make repairs, adjustments, etc. The inlet side of the sheath 310 may be surrounded by a mesh enclosure 360 to prevent unwanted objects from reaching the inlet side of the sheath 310. The mesh enclosure 360 may include an access gate (not illustrated) for operators to open and access the inlet side of the conduit 180.

A zoomed-in perspective view of the inlet head 320 is shown in FIG. 3e. As illustrated, the inlet head 320 comprises an outer casing 323, a set of buoyancy tubes (324a, 324b), a plurality of perforations 325 in the outer casing 323, and a hinging joint 326. The outer casing 323 provides a suitable surface area and size to collect sediment from the trench 132. One or more buoyancy tubes (324a, 324b) may be used. The buoyancy tubes (324a, 324b) may reduce the downward force that the inlet head 320 exerts on the first arm 222 of the vertical structure 220a. The perforations 325 allow for sediment of an acceptable size to enter the conduit 180. The hinging joint 326 allows for the angle defined by the first arm 222 and inlet head 320 to adjust based on the position of the inlet head 320.

Figure 5:
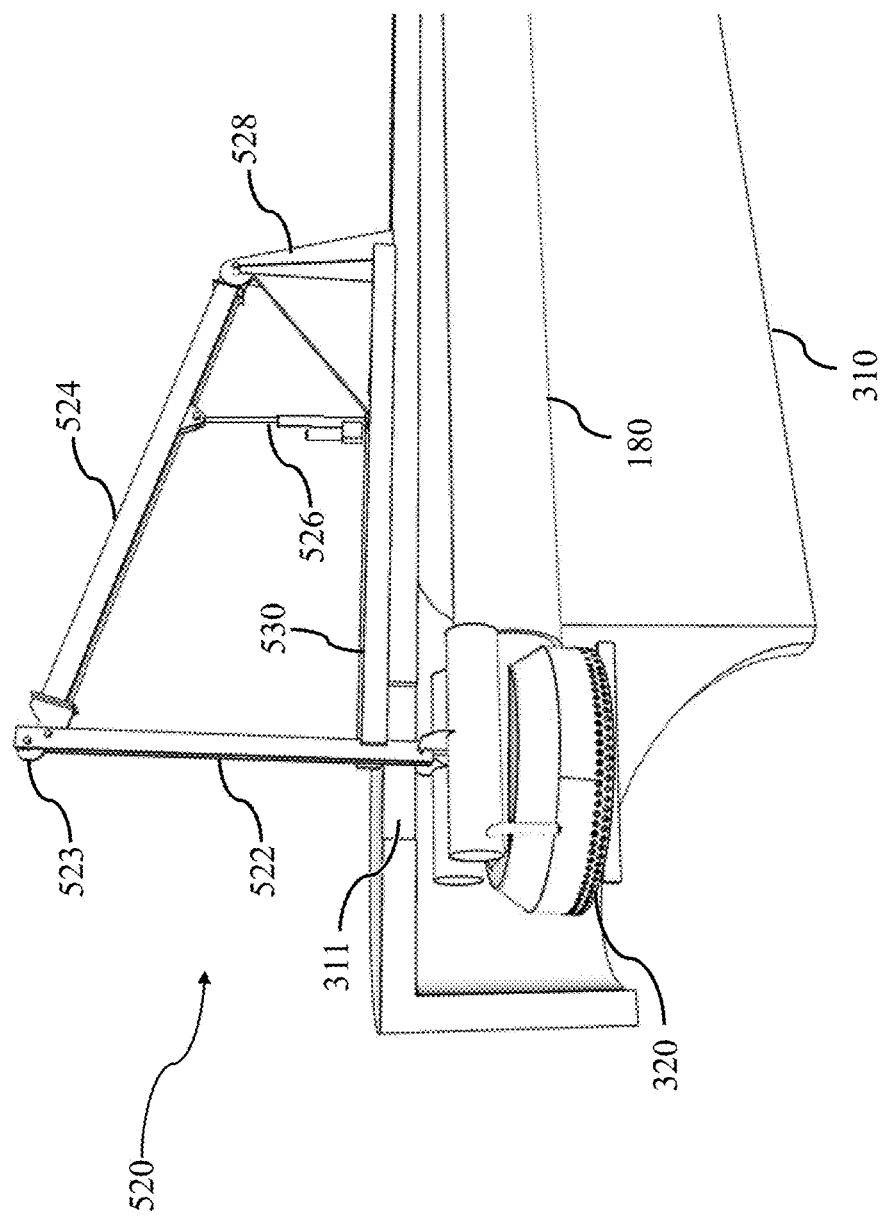
FIG. 5 is a side cutaway view of an example embodiment of a first vertical structure.

In another embodiment, the first vertical structure 220a has a design corresponding to the design shown in FIG. 5. As illustrated in FIG. 5, the vertical structure 520 comprises a first portion of a vertical arm 522 attached to an inlet head 320, the inlet head 320 being substantially the same as described above. The structure 520 also comprises a horizontal arm 524 connected to the vertical arm 522 via a pivot joint 523. The inlet head 320 moves upward and downward by action of the piston 526. The structure 520 also includes a support structure 528 at the opposing end of the horizontal arm 524 attached by a second pivot joint 527. The support structure 528 secures the structure 520 to the conduit sheath 310. The system also includes the second horizontal arm 530 that rests upon the conduit sheath 310 and provides additional support to the movable vertical arm 522. The sheath 310 in this figure is a cutaway to show the interior of the sheath, including the inlet head 320 and the conduit 180.

The conduit sheath 310 may be supported on the floor 134 of the body of water 10 with a plurality of couplings 330 to couple each section of the sheath 310 together. Moreover, a plurality of footings 332 (e.g., made of concrete) may be used to secure the sheath 310 to the floor 134 of the body of water 10. A plurality of vertical structures, such as a second vertical structure 220b may be included along the length of the conduit 180 (e.g., as shown in FIG. 3a). The second vertical structure 220b and any additional vertical structures may include an arm that connects to the conduit 180 via a hinge that is secured to the conduit 180. The second and any additional vertical structures may be partially submerged, such as the illustrated first vertical structure 220a and second vertical structure 220b. However, the additional vertical structures may be fully submerged under water, depending on the needs of the system 100 and the regulations of the local, national, and/or regional governing bodies. An exemplary secondary vertical structure 220b along the conduit sheath 310 is shown in FIG. 3g. The second vertical structure 220b as illustrated does not significantly differ from the first vertical structure 220a shown in the prior figures. However, the second vertical structure 220b includes a removable manhole 340. The removable manhole 340 may be removed, and operators may inspect the inside of the conduit sheath 310. In contradistinction, the first vertical structure 220a does not include a removable manhole cover and the inside of the conduit sheath 310 may be inspected through the opening 312 and/or through the mesh enclosure 360.

The unsheathed portions of the conduit 180 may also be stabilized by a plurality of stabilizing elements, such as the stabilizing element 350 shown in FIG. 3h. As illustrated, the stabilizing element 350 includes a first footing 351a and a second footing 351b. The first footing 351a and second footing 351b are connected via an arch element 352. The arch element 352 includes at least two ropes (353a, 353b). The conduit 180 is disposed between the two ropes (353a, 353b). As the conduit 180 moves up and down, and/or side to side, the ropes prevent the conduit 180 from moving outside a region defined by the ropes. In effect, the conduit 180 does not touch the floor 134 of the body of water 10 at this location but may in other locations of the conduit 180. These structures hold the pipe at the proper elevation to reduce sediment accumulation in the conduit.

The system 100 may also include a second pump system for pumping water from the body of water 10 (e.g., lake water) into the backwash zone 160 through the egress conduit 190. The egress conduit 190 may transition into perforated pipe as it enters the filter bed. The second pump system may similarly comprise a sensor, a pump, and a power source. The power source may be the power source described above in relation to the first pump system, or it may be a different power source, or the pump and/or sensor may receive power from a combination thereof. As noted above, the second pump system may be included in the pump station where the first pumping system is found. As noted above, the egress conduit 190 may be used to backwash the bed medium 164, and the pumps for doing so may be reversible pumps. As also mentioned above, one or more backwashing operations may be performed daily during the light-cycle using the egress conduit 190, depending on the needs of the system 100.

Figure 6:
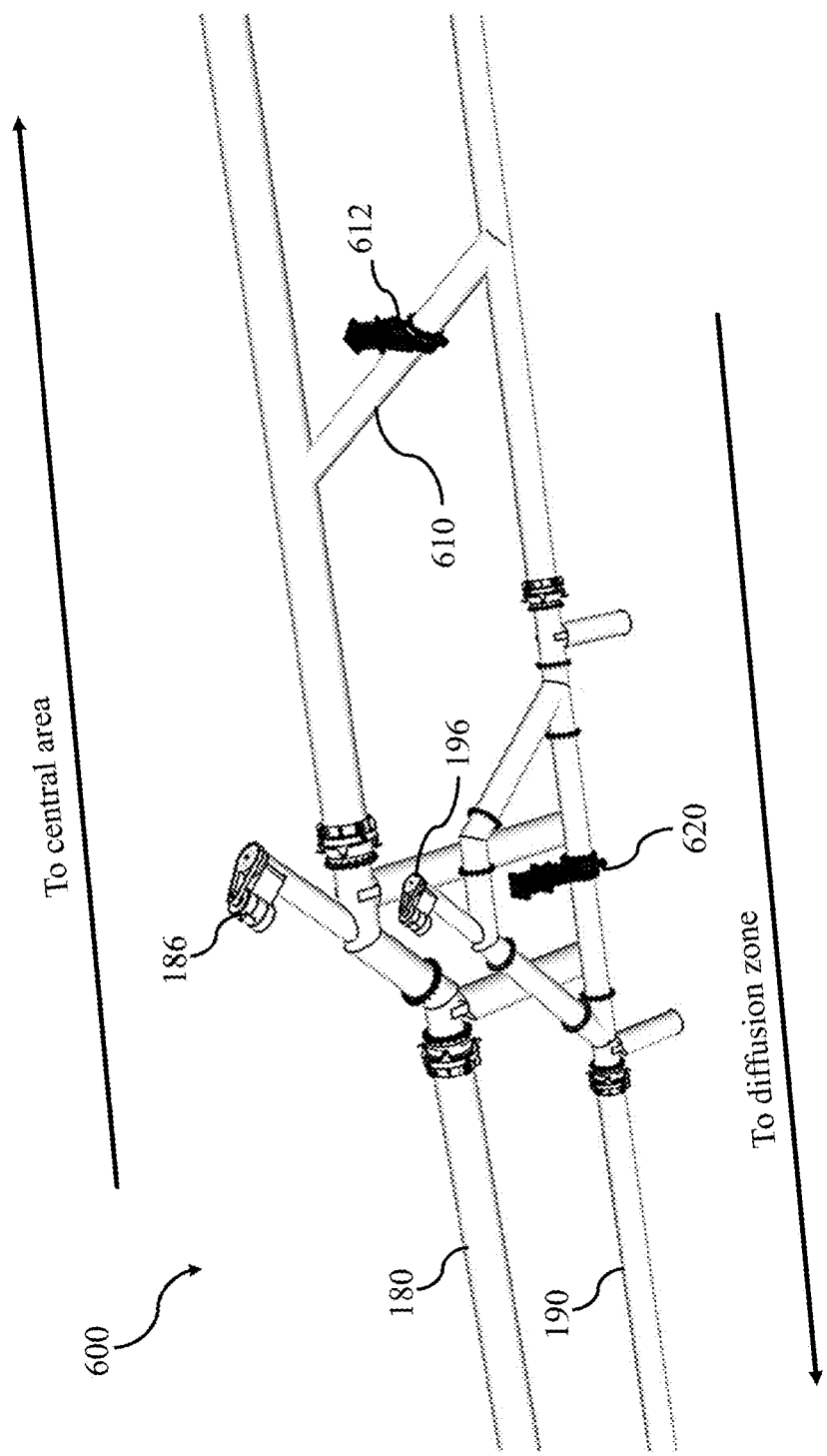
FIG. 6 is a perspective view of an example embodiment dual pumping system, including a first pumping system and second pumping system for the ingress conduit and egress conduit, respectively.

With reference now to FIG. 6, a dual pumping system 600 showing a first and second pumping system is shown. As illustrated, the system 600 includes the conduits (180, 190) and their respective pumps (186, 196). The illustrated pumps (186, 196) are axial flow pumps. The conduits (180, 190) are connected via a connecting conduit 610. Flow patterns in the system 600 are regulated by the egress conduit valve 620 and the connecting conduit valve 612. The described system 600 may allow for certain flow patterns that are unique to the systems 100 described herein. For instance, during dewatering (e.g., during night time when insufficient solar power is available and water drains back to the body of water), connecting conduit valve 612 is closed, the egress conduit valve 620 is open and water flows through the egress conduit 190. If, for any circumstance the dewatering of the system is insufficiently slow, dewatering may be aided as follows. With the connecting conduit valve 612 closed, water may be actively pumped from the trench 132 in conduit 180 to the central area 170. Concomitantly, the egress conduit 190 may dewater the system, actively (e.g., with the pump 196) or passively (e.g., by hydrostatic pressure). Backwashing may also be performed with the system 600. For instance, the first pump 186 and second pump 196 may actively pump water towards the central area. The connecting conduit valve 612 may be open during this process to allow water from the ingress conduit 180 to contribute to the backwashing. The backwashing is generally in relation to the bed medium 164 described above.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

I claim:

1. A system for reducing contaminants in a body of water, wherein the system comprises:
   a. a first land mass defining a first enclosed area within the body of water;
   b. a lagoon enclosed by the first land mass;
   c. a sediment trap defined by a trench on a floor of the body of water outside the first land mass, wherein the sediment trap is configured for collecting sediment;
   d. a tussock mass area enclosed by the first land mass, wherein the tussock mass area is configured for collecting the sediment and building a second land mass for roots and trees;
   e. a backwash zone comprising a first volume of water, wherein the backwash zone is positioned between the tussock mass area and the first land mass;
   f. a central area surrounded by the tussock mass area, wherein the central area is configured for removal of contaminants from the sediment;
   g. a first ingress conduit and a first pumping system, wherein the first ingress conduit extends from the sediment trap to the central area, wherein the first ingress conduit and the first pumping system are configured for moving the sediment from the sediment trap to the central area; and,
   h. an egress conduit extending from the backwash zone to outside the first land mass, wherein the egress conduit passively allows filtered water to move from the backwash zone to outside the first land mass.

2. The system for reducing contaminants from claim 1, wherein the system further includes a second pump system for pumping water into the backwash zone through the egress conduit.

3. The system for reducing contaminants from claim 1, wherein the central area defines at least one of a marshy area and a watery area wherein the watery area comprises contaminated sediment and water with an amount of aquatic filter feeders.

4. The system for reducing contaminants from claim 1, wherein the system further includes an erosion barrier disposed outside the first land mass, wherein the erosion barrier defines a corrugated shaped limestone mass.

5. The system for reducing contaminants from claim 4, wherein the system further includes a diffusion zone disposed between the erosion barrier and the first land mass, wherein the diffusion zone comprises a second volume of water.

6. The system for reducing contaminants of claim 1, wherein a sediment capacity of the central area is proportional to an elevation of the second land mass.

7. The system for reducing contaminants of claim 2, wherein the first land mass defines a ring shape.

8. The system for reducing contaminants of claim 1, wherein the first pumping system comprises: a pump in fluid communication with the first ingress conduit configured to move water into an inlet of the first ingress conduit; a sensor configured to detect a turbidity of the water being moved by the pump; a power source in electrical communication with the pump; a first vertical structure positioned at a first location near the inlet of the first ingress conduit; a first arm in attachment with the first vertical structure, the first arm connecting a first portion of the first ingress conduit to the first vertical structure; and, wherein the first arm adjusts the first portion of the first ingress conduit based on the turbidity of the water being moved by the pump.

9. The system for reducing contaminants of claim 1, wherein the backwash zone comprises a bed medium comprising carbonaceous aggregate configured to filter mud and phosphorus.

10. The system for reducing contaminants of claim 9, wherein a first end of the egress conduit is embedded in the bed medium in the backwash zone.

11. The system for reducing contaminants of claim 1, wherein the tussock mass area comprises: an inner tussock berm comprising an inner berm top end; an outer tussock berm comprising an outer berm top end; vegetation and a second volume of water positioned between the inner tussock berm and the outer tussock berm.

12. The system for reducing contaminants of claim 11, wherein the vegetation comprises a plurality of *Annona glabra* pond apple trees.

13. A system for reducing contaminants in a body of water, wherein the system comprises:
   a. a first land mass defining a first enclosed area within the body of water, wherein the first land mass defines a ring shape;
   b. a lagoon enclosed by the first land mass;
   c. a sediment trap defined by a trench on a floor of the body of water outside the first land mass, wherein the sediment trap is configured for collecting sediment;
   d. a tussock mass area enclosed by the first land mass, wherein the tussock mass area is configured for collecting sediment and building a second land mass for roots and trees;
   e. a backwash zone comprising a volume of water, wherein the backwash zone is positioned between the tussock mass area and the first land mass;
   f. a central area surrounded by the tussock mass area, wherein the central area is configured for removal of contaminants from contaminated sediment;
   g. a first ingress conduit and a first pumping system, wherein the first ingress conduit extends from the sediment trap to the central area, wherein the first ingress conduit and the first pumping system are configured for moving the contaminated sediment from the sediment trap to the central area;
   h. a pump of the first pumping system in fluid communication with the first ingress conduit configured to move water into an inlet of the first ingress conduit;
   i. a sensor configured to detect for a turbidity of the water being moved by the pump;
   j. a power source in electrical communication with the pump;
   k. a first vertical structure positioned at a first location near the inlet of the first ingress conduit;
   l. a first arm in attachment with the first vertical structure, the first arm connecting a first portion of the first ingress conduit to the first vertical structure; and,
   m. wherein the first arm adjusts the first portion of the first ingress conduit based on the turbidity of the water being moved by the pump.

14. The system for reducing contaminants from claim 13, wherein the system further includes an erosion barrier disposed outside the first land mass, wherein the erosion barrier defines a corrugated shaped limestone mass.

15. The system for reducing contaminants of claim 14, wherein the backwash zone comprises a bed medium comprising carbonaceous aggregate configured to filter mud and phosphorus.

16. The system for reducing contaminants of claim 15, wherein a first end of an egress conduit is embedded in the bed medium in the backwash zone.

17. A method for reducing contaminants from a body of water comprising: collecting contaminated sediment having contaminants and water in a sediment trap configured for collecting sediment, wherein the sediment trap is defined by a trench on a floor of the body of water positioned outside a first land mass; a lagoon enclosed by the first land mass, wherein the first land mass defines a first enclosed area within the body of water; pumping, through an ingress conduit using a first pumping system, the contaminated sediment and the water from outside the first enclosed area to a central area, configured for removal of contaminants from sentiment, wherein the ingress conduit extends from the sediment trap to the central area, wherein the central area is surrounded by a tussock mass area, wherein the tussock mass area is enclosed by the first land mass, and wherein the tussock mass area is configured for collecting the sediment and building a second land mass for roots and trees; allowing settling of the contaminated sediment in the central area, such that the contaminants in the contaminated sediment accumulate within the first enclosed area; removing contaminants within the first enclosed area with vegetation disposed within the first enclosed area; removing purified water though an egress conduit, where the purified water has a reduced concentration of contaminants, wherein the egress conduit extends from a backwash zone to outside the first land mass, wherein the backwash zone comprises a first volume of water and is positioned between the tussock mass area and the first land mass; and wherein the egress conduit passively allows filtered water to move from the backwash zone to outside the first land mass.

18. The method for reducing contaminants from a body of water of claim 17, wherein the method further comprises filtering water entering into a first end of the egress conduit using a bed medium comprising carbonaceous aggregate, wherein the bed medium is disposed proximate to the first land mass inside the first enclosed area, and wherein the first end of the egress conduit is embedded in the bed medium.

19. The method for reducing contaminants from a body of water of claim 18, wherein the method further comprises:
   reducing erosion of the first land mass by disposing an erosion barrier between the first land mass and the trench, wherein the erosion barrier comprises a corrugated shaped limestone ring; and,
   flushing the bed medium by pumping water from outside the first enclosed area into the first enclosed area through the egress conduit.

* * * * *